(12) United States Patent
Ramsey et al.

(10) Patent No.: US 12,234,377 B2
(45) Date of Patent: Feb. 25, 2025

(54) COMPOSITIONS, DEVICES, AND METHODS FOR IMPROVING A SURFACE PROPERTY OF A SUBSTRATE

(71) Applicant: The University of North Carolina at Chapel Hill, Chapel Hill, NC (US)

(72) Inventors: John Michael Ramsey, Chapel Hill, NC (US); William Hampton Henley, Chapel Hill, NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 935 days.

(21) Appl. No.: 17/048,114

(22) PCT Filed: May 15, 2019

(86) PCT No.: PCT/US2019/032389
§ 371 (c)(1),
(2) Date: Oct. 16, 2020

(87) PCT Pub. No.: WO2020/068174
PCT Pub. Date: Apr. 2, 2020

(65) Prior Publication Data
US 2021/0171798 A1 Jun. 10, 2021

Related U.S. Application Data

(60) Provisional application No. 62/673,343, filed on May 18, 2018.

(51) Int. Cl.
*C09D 183/08* (2006.01)
*B01L 3/00* (2006.01)
(Continued)

(52) U.S. Cl.
CPC ...... *C09D 183/08* (2013.01); *B01L 3/502707* (2013.01); *C09D 5/00* (2013.01); *C09D 7/20* (2018.01); *B01L 2300/165* (2013.01)

(58) Field of Classification Search
CPC .......... C09D 183/08; C09D 7/20; C09D 5/00; B01L 3/502707; B01L 2300/165
See application file for complete search history.

(56) References Cited

U.S. PATENT DOCUMENTS 4,978,540 A 12/1990 Lee
5,628,833 A 5/1997 McCormack et al.
(Continued)

FOREIGN PATENT DOCUMENTS

CN 1464071 A 12/2003
CN 101553306 A 10/2009
(Continued)

OTHER PUBLICATIONS

Arkles, Barry "Hydrophobicity, Hydrophilicity and Silane Surface Modification" Gelest, Inc., Version 2.0, 84 pages (2011) https://www.pcimag.com/ext/resources/PCI/Home/Files/PDFs/Virtual_Supplier_Brochures/Gelest_Additives.pdf.
(Continued)

*Primary Examiner* — Robert S Walters, Jr.
(74) *Attorney, Agent, or Firm* — Myers Bigel, P.A.

(57) ABSTRACT

Described herein are compositions, devices, and methods for improving a surface property of a substrate. In some embodiments, the hydrophobicity and/or fluorocarbon-phobicity of the surface is increased. Some embodiments include compositions, devices and methods for improving bead loading and/or immiscible oil sealing of microwell array reactions on plastic microfluidic devices.

21 Claims, 8 Drawing Sheets

(51) Int. Cl.
   *C09D 5/00*  (2006.01)
   *C09D 7/20*  (2018.01)

(56) References Cited

U.S. PATENT DOCUMENTS

| | | | |
|---|---|---|---|
| 6,042,709 | A | 3/2000 | Parce et al. |
| 6,143,496 | A | 11/2000 | Brown et al. |
| 6,387,331 | B1 | 5/2002 | Hunter |
| 6,565,813 | B1 | 5/2003 | Garyantes |
| 6,589,779 | B1 | 7/2003 | McDevitt et al. |
| 6,716,629 | B2 | 4/2004 | Hess et al. |
| 8,222,047 | B2 | 7/2012 | Duffy et al. |
| 8,236,574 | B2 | 8/2012 | Duffy et al. |
| 8,460,878 | B2 | 6/2013 | Walt et al. |
| 8,460,879 | B2 | 6/2013 | Walt et al. |
| 8,492,098 | B2 | 7/2013 | Walt et al. |
| 8,846,415 | B2 | 9/2014 | Duffy et al. |
| 9,110,025 | B2 | 8/2015 | Rissin et al. |
| 9,329,174 | B2 | 5/2016 | Noji et al. |
| 2002/0094533 | A1 | 7/2002 | Hess et al. |
| 2002/0102578 | A1 | 8/2002 | Dickinson et al. |
| 2002/0150723 | A1 | 10/2002 | Oles et al. |
| 2003/0049620 | A1 | 3/2003 | Lai et al. |
| 2003/0082576 | A1 | 5/2003 | Jones et al. |
| 2003/0124716 | A1 | 7/2003 | Hess et al. |
| 2004/0014168 | A1 | 1/2004 | Schreiber et al. |
| 2005/0059048 | A1 | 3/2005 | Gunderson et al. |
| 2006/0088857 | A1 | 4/2006 | Attiya et al. |
| 2006/0228734 | A1 | 10/2006 | Vann et al. |
| 2008/0008628 | A1 | 1/2008 | Park et al. |
| 2009/0032401 | A1 | 2/2009 | Ronaghi et al. |
| 2009/0146380 | A1 | 6/2009 | Votaw et al. |
| 2010/0137143 | A1 | 6/2010 | Rothberg et al. |
| 2010/0184036 | A1 | 7/2010 | Fu |
| 2010/0248991 | A1 | 9/2010 | Roesler et al. |
| 2010/0255471 | A1 | 10/2010 | Clarke et al. |
| 2010/0317535 | A1 | 12/2010 | Schmidt et al. |
| 2011/0009275 | A1 | 1/2011 | Leamon et al. |
| 2011/0123413 | A1 | 5/2011 | Abate et al. |
| 2011/0135819 | A1 | 6/2011 | Chang et al. |
| 2012/0196774 | A1 | 8/2012 | Fournier et al. |
| 2012/0202709 | A1 | 8/2012 | Bergo |
| 2012/0322666 | A1 | 12/2012 | Pham et al. |
| 2013/0345088 | A1 | 12/2013 | Noji et al. |
| 2014/0323330 | A1 | 10/2014 | Bergo |
| 2015/0151298 | A1 | 6/2015 | Hobbs et al. |
| 2015/0211048 | A1 | 7/2015 | Ramsey et al. |
| 2016/0216607 | A1 | 7/2016 | Sato |
| 2016/0220995 | A1 | 8/2016 | Atashbar et al. |
| 2016/0223531 | A1 | 8/2016 | Noji et al. |

FOREIGN PATENT DOCUMENTS

| | | |
|---|---|---|
| CN | 101848765 A | 9/2010 |
| CN | 104540901 A | 4/2015 |
| EP | 1245655 A2 | 10/2002 |
| JP | H0688025 A | 3/1994 |
| JP | 2002502955 A | 1/2002 |
| JP | 2002322299 A | 11/2002 |
| JP | 2003009890 A | 1/2003 |
| JP | 2004518115 A | 6/2004 |
| JP | 2007525963 A | 9/2007 |
| JP | 2010515566 A | 5/2010 |
| JP | 2010519896 A | 6/2010 |
| JP | 2013536302 A | 9/2013 |
| JP | 2021509776 A | 4/2021 |
| WO | 9111533 A1 | 8/1991 |
| WO | 9637630 A1 | 11/1996 |
| WO | 9939829 A1 | 8/1999 |
| WO | 2005071056 A1 | 8/2005 |
| WO | 2007092713 A2 | 8/2007 |
| WO | 2008088323 | 7/2008 |
| WO | 2009078812 A1 | 6/2009 |
| WO | 2009145022 A1 | 12/2009 |
| WO | 2012004353 A1 | 1/2012 |
| WO | 2012027238 A1 | 3/2012 |
| WO | 2012055069 A1 | 5/2012 |
| WO | 2013176767 | 11/2013 |
| WO | 2013188872 A1 | 12/2013 |
| WO | 2014024162 A1 | 2/2014 |
| WO | 2015038767 A1 | 3/2015 |
| WO | 2017015529 | 1/2017 |
| WO | 2017065854 | 4/2017 |
| WO | 2017112025 | 6/2017 |
| WO | 2020131182 | 6/2020 |
| WO | 2020162996 | 8/2020 |

OTHER PUBLICATIONS

Berti et al. "Microfluidic-based electrochemical genosensor coupled to magnetic beads for hybridization detection" Talanta, 77:971-978 (2009).

Bhattacharyya et al. "Thermoplastic Microfluidic Device for On-Chip Purification of Nucleic Acids for Disposable Diagnostics" Analytical Chemistry, 78(3): 788-792 (2006) (Abstract only).

Boxshall et al. "Simple surface treatments to modify protein adsorption and cell attachment properties within a poly (dimethylsiloxane) micro-bioreactor" Surface Interface Analysis, 38(4):198-201 (2006) (Abstract only).

Cameron et al. "High fidelity, high yield production of microfluidic devices by hot embossing lithography: rheology and stiction" Lab on a Chip, 6(7):936-941 (2006) (Abstract only).

Carvalho et al. "Mild and Selective C—H Activation of COC Microfluidic Channels Allowing Covalent Multifunctional Coatings" Applied Materials & Interfaces, 9:16644-16650 (2017).

Chang et al. "Single molecule enzyme-linked immunosorbent assays: Theoretical considerations" Journal of Immunological Methods 378:102-115 (2012).

Definition of "immiscible," dictionary.com, available at https://www.dictionary.com/browse/immiscible, accessed Jan. 8, 2021.

Dorre et al. "Techniques for single molecule sequencing" Bioimaging, 5:139-152 (1997).

Du et al. "SlipChip" Lap Chip, 9(16):2286-2292 (2009).

Gandhiraman et al. "High Efficiency Amine Functionalization of Cyclo Olefin Polymer Surfaces for Biodiagnostics" Journal of Materials Chemistry, 20:4116-4127 (2010).

Gibbs et al. "Effective Blocking Procedures in ELISA Assays", Corning, 2001-2017 Corning Incorporated, All Rights Reserved, Oct. 2017, CLS-DD-AN-456 REV1, 4 pages.

Handique et al. "Microfluidic flow control using selective hydrophobic patterning" SPIE, 3224:185-195 (1997).

Henley et al. "Fabrication of Microfluidic Devices Containing Patterned Microwell Arrays" Analytical Chemistry, 84:1776-1780 (2012).

Hindson et al. "High-Throughput Droplet Digital PCR System for Absolute Quantitation of DNA Copy Number" Analytical Chemistry, 83:8604-8610 (2011).

Hinz et al. "Polymer support for exonucleolytic sequencing" Journal of Biotechnology, 86:281-288 (2001).

Hjerten, Stellan "High-performance electrophoresis: Elimination of electroendosmosis and solute adsorption" Journal of Chromatography A, 347:191-198 (1985).

Holmberg et al. "The biotin-streptavidin interaction can be reversibly broken using water at elevated temperatures" Electrophoresis, 26:501-510 (2005).

Huang et al. "Highly sensitive mutation detection based on digital amplification coupled with hydrogel bead-array" ChemComm, 27:4094-4096 (2009).

Kalinina et al. "Nanoliter scale PCR with TaqMan detection" Nucleic Acids Research, 25(10):1999-2004 (1997).

Kan et al. "Isolation and Detection of Single Molecules on Paramagnetic Beads Using Sequential fluid Flows in Microfabricated Polymer Array Assemblies" Lab Chip, 12:977-985 (2012).

Kim et al. "Protein immobilization techniques for microfluidic assays" Biomicrofluidics, 7(4):041501 (2013).

Kitsara et al. "Integration of functional materials and surface modification for polymeric microfluidic systems" Journal of Micromechanics and Microengineering, 23(033001) 19 pages (2013).

(56) References Cited

OTHER PUBLICATIONS

Leamon et al. "A Massive parallel PicoTiterPlate based platform for discrete picoliter-scale polymerase chain reactions" Electrophoresis, 24:3769-3777 (2003).
Leamon et al. "Overview: methods and applications for droplet compartmentalization of biology" Nature Methods, 3(7):541-543 (2006).
Lindstrom et al. "PCR amplification and genetic analysis in a microwell cell culturing chip" Lab Chip, 9(24):3465-3471 (2009).
Lizardi et al. "Mutation detection and single-molecule counting using isothermal rolling-circle amplification" Nature Genetics, 19:225-232 (1998).
Malmstadt et al. "A Smart Microfluidic Affinity Chromatography Matrix Composed of Poly(N-isopropylacrylamide)-Coated Beads" Analytical Chemistry, 75:2943-2949 (2003).
Margulies et al. "Genome sequencing in microfabricated high-density picolitre reactors" Nature, 437(15):376-380 (2005).
Nagai et al. "Development of a Microchamber Array for Picoliter PCR" Analytical Chemistry, 73:1043-1047 (2001).
Nagai et al. "High-throughput PCR in silicon based microchamber array" Biosensors and Bioelectronics, 16(9-12):1015-1019 (2001) (Abstract only).
Nakano et al. "In Vitro Combinatorial Mutagenesis of the 65th and 222nd Positions of the Green Fluorescent Protein of Aequarea victoria" Biotechnology and Bioprocess Engineering, 7:311-315 (2002).
Osborne et al. "Single-Molecule Analysis of DNA Immobilized on Microspheres" Analytical Chemistry, 72:3678-3681 (2000).
Ottesen et al. "Microfluidic Digital PCR Enables Multigene Analysis of Individual Environmental Bacteria" Science, 314(5804):1464-1467 (2006).
Perez-Toralla et al. "New non-covalent strategies for stable surface treatment of thermoplastic chips" Lab on a Chip, 22(13):4409-4418 (2013).
Quanterix "Scientific Principle of Simoa (Single Molecule Array) Technology" (2 pages) (2013).
Rissin et al. "Single-Molecule enzyme-linked immunosorbent assay detects serum proteins at subfemtomolar concentrations" Nature Biotechnology, 28(6):595-599 (2010).
Rissin et al. "Multiplexed single molecule immunoassays" Lab on a Chip 13:2902-2911 (2013).
Rissin et al. "Simultaneous Detection of Single Molecules and Singulated Ensembles of Molecules Enables Immunoassays with Broad Dynamic Range" Analytical Chemistry 83:2279-2285 (2011).
Rissin, David M. "Single Molecule Detection: Analytical Applications and Fundamental Studies" Dissertation, Tufts University (183 pages) (Apr. 2007).
Schroeder et al. "User Configurable Microfluidic Device for Multiplexed Immunoassays Based on DNA-Directed Assembly" Analytical Chemistry, 81:1275-1279 (2009).
Selck et al. "Increased Robustness of Single-Molecule Counting with Microfluidics, Digital Isothermal Amplification, and a Mobile Phone versus Real-Time Kinetic Measurements" Analytical Chemistry, 85(22):11129-11136 (2013) (Abstract only).
Shao et al. "Emulsion PCR: A High Efficient Way of PCR Amplification of Random DNA Libraries in Aptamer Selection" PLoS ONE, 6(9):e24910 (2011).
Song et al. "A Microfluidic System for Controlling Reaction Networks in Time" Angewandte Chemie, 42(7):768-772 (2003).
Song et al. "Direct Detection of Bacterial Genomic DNA at Sub-Femtomolar Concentrations Using Single Molecule Arrays" Analytical Chemistry 85:1932-1939 (2013).
Steinitz, Michael "Quantitation of the Blocking Effect of Tween 20 and Bovine Serum Albumin in ELISA Microwells," Analytical Biochemistry 282, pp. 232-238 (2000).
Tan et al. "Monitoring the Reactions of Single Enzyme Molecules and Single Metal Ions" Analytical Chemistry, 69:4242-4248 (1997).
Taylor et al. "Impact of Surface Chemistry and Blocking Strategies on DNA Microarrays" Nucleic Acids Research, 31(16):e87 (2003).
Thermo Scientific "Instructions, StartingBlock Blocking Buffers" (3 pages) (2012).
Thompson et al. "Microfluidics for Single-Cell Genetic Analysis" Lab on a Chip, 14(17):3135-3142 (2014).
Tice et al. "Formation of Droplets and Mixing in Multiphase Microfluidics at Low Values of the Reynolds and the Capillary Numbers" Langmuir, 19:9127-9133 (2003).
Yelleswarapu et al. "Ultra-high throughput detection (1 million droplets per second) of fluorescent droplets using a cell phone camera and time domain encoded optofluidics" Lab on a Chip, 6(17):1083-1094 (2017) (Abstract only).
Yeo et al. "Microfluidic Devices for Bioapplications" Small, 7(1):12-48 (2011).
Zammatteo et al. "Comparison between Microwell and Bead Supports for the Detection of Human Cytomegalovirus Amplicons by Sandwich Hybridization" Analytical Biochemistry, 253:180-189 (1997).
International Search Report and the Written Opinion of the International Searching Authority corresponding to International Patent Application No. PCT/US2019/032389 (12 pages) (mailed Apr. 21, 2020).
Extended European Search Report corresponding to European Patent Application No. 19866781.8 (9 pages) (dated Mar. 21, 2022).
Japanese Office Action corresponding to JP 2020-557995; dated Apr. 2, 2024, (6 pages, including English translation).

KRYTOX GPL104 ON NATIVE COP

KRYTOX GPL104 ON DDHMTS-TREATED COP

COMPOSITIONS, DEVICES, AND METHODS FOR IMPROVING A SURFACE PROPERTY OF A SUBSTRATE

RELATED APPLICATION DATA

This application claims the benefit of U.S. Provisional Patent Application Ser. No. 62/673,343, filed May 18, 2018, the disclosure of which is incorporated by reference herein in its entirety.

STATEMENT OF FEDERAL SUPPORT

This invention was made with government support under Grant No. HR0011-12-2-0001 awarded by the United States Department of Defense (DARPA). The government has certain rights in the invention.

FIELD

The present invention concerns compositions, devices, and methods for improving a surface property of a substrate. In some embodiments, the present invention concerns compositions, devices and methods for improving bead loading and/or immiscible oil sealing of microwell array reactions on plastic microfluidic devices.

BACKGROUND

Digital assays are becoming increasingly popular and differ from traditional analog assays in that they partition or segment the total reaction volume into many smaller and "parallel" reactions. Typically, a smaller reaction volume is chosen such that it will contain either 1 or 0 molecules of interest. After the reaction is complete, the number of positive and negative reactions are determined and the percentage is used to determine an initial sample concentration. By allowing the counting of individual molecules, read noise at low concentrations is greatly reduced, decreasing variance at low concentrations. This allows for quantification that is more precise and enables lower limits of detection (LODs).

Segmentation of the reaction can fall into two main categories: (1) aqueous droplets in an immiscible oil and (2) an array of small volume reaction wells formed in a substrate similar to a microtiter plate but often with smaller volume and greater numbers and densities of reactions. There are several methods by which reactions in a solid array can be isolated from one another such as sealing with a silicone rubber gasket, sealing by mechanical separation, or an immiscible sealing oil (Kan et al. *Lab Chip,* 2012, 12, 977; U.S. Pat. No. 9,329,174; US 2013/0345088; and US 2012/0196774).

Aqueous droplets in an oil phase can be made by standard macro-scale emulsion protocols, but droplet size can vary, reducing quantification utility. Therefore, for analytical purposes, microfluidic methods are typically preferred as they produce a lower distribution of droplet sizes, at a droplet volume optimized for the assay. However, droplet generation is a serial process at each droplet generator, limiting throughput and often requiring significant preparation time or the use of many parallel droplet generators. Solid array methods can also generate droplets of predetermined size with low variance, but segmentation can be more easily performed in parallel, allowing for very high numbers of reactions to be generated in a short period of time.

Sealing with an immiscible oil offers the advantages of low complexity, higher tolerance for surface contamination, and low manufacturing costs compared to using a silicone rubber gasket (Kan et al. *Lab Chip,* 2012, 12, 977 and US 2013/0345088); however, careful consideration must be paid to surface properties and the composition of the aqueous buffer(s) and immiscible oil(s). The method of immiscible oil sealing can include flooding the array substrate with aqueous solution to fill all of the reaction wells and the space above them. A sealing oil is then flowed over the wells such that it pushes all of the aqueous solution out of the space above the wells but leaves the now isolated volumes of aqueous solution in the wells. "Pinning" of the droplets in the wells is caused by the surface tension of the aqueous phase and the shape of the wells (particularly the edge at the top of the well).

Typically, hydrophobic surfaces with a large water contact angle and aqueous phases with relatively high surface tension (e.g., those with low or zero surfactant concentration) are needed to prevent the aqueous phase from fluidically connecting or "bridging" the reaction wells. If the contact angle of the array substrate is insufficient (e.g., it contains some concentration of surfactants or other surface tension lowering entity), it can result in undesirable aqueous bridging, resulting in well-to-well crosstalk or blending of the reaction contents. This is often undesirable for reactions that are intended to be isolated from one another.

Unfortunately, few polymeric materials possess the ideal properties for immiscible oil sealing of aqueous reactions: high aqueous contact angle, optical purity at desired wavelengths, low cost, facile injection molding or embossing at tight tolerances and micrometer scale critical dimensions, temperature stability, and low vapor permeability. Plastic surfaces can also be difficult to reliably functionalize due to their properties including the lack of suitable reactive chemical groups.

Some polymers, such as cyclic olefin copolymer (COC) and cyclic olefin polymer (COP), for example, are optically pure at visible and near-visible wavelengths, are low cost, have excellent injection molding properties, temperature stability, and low vapor permeability. However, their native-surface aqueous contact angle is typically about 90°. Hydrophobicity values above 90° may be preferred for sealing, especially if surfactants or hydrophilic polymers are present in the aqueous phase. Surfactants both lower the surface tension of the aqueous phase and can coat the polymer surface (as can hydrophilic polymers), rendering it hydrophilic. This effect can be semi-permanent, where the surface retains at least some hydrophilic character despite subsequent washes with surfactant-free and/or polymer-free water or buffer.

COC and COP are relatively inert and thus difficult to functionalize. Some processes have been described for permanently modifying these plastics through covalent functionalization after a plasma, UV, and/or ozone treatment; however, these processes can be expensive and difficult to apply in mass production with bonded microfluidic devices.

SUMMARY

One aspect of the present invention is directed to a composition comprising a coating reagent and a solvent, wherein the coating reagent is present in the composition in an amount from about 0.01% to about 5% by volume of the solvent.

Another aspect of the present invention is directed to a method of forming a film on a surface of a substrate, the method comprising: contacting a surface of a substrate with a composition comprising a coating reagent; and forming a film of the coating reagent on the surface of the substrate.

A further aspect of the present invention is directed to a substrate comprising a film on a surface of the substrate, wherein the film comprises a coating reagent and the coating reagent is a silane, a siloxane (e.g., a trisiloxane), optionally a halogen (e.g., fluorine) substituted siloxane, and/or a halogen (e.g., fluorine) substituted hydrocarbon.

Another aspect of the present invention is directed to a device comprising a film on a surface of the device, wherein the film comprises a coating reagent and the coating reagent is a silane, a siloxane (e.g., a trisiloxane), optionally a halogen (e.g., fluorine) substituted siloxane, and/or a halogen (e.g., fluorine) substituted hydrocarbon. In some embodiments, the film is present on a surface of at least one channel in the device. In some embodiments, the device is a microfluidic device.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EXAMPLE EMBODIMENTS

Figure 1:
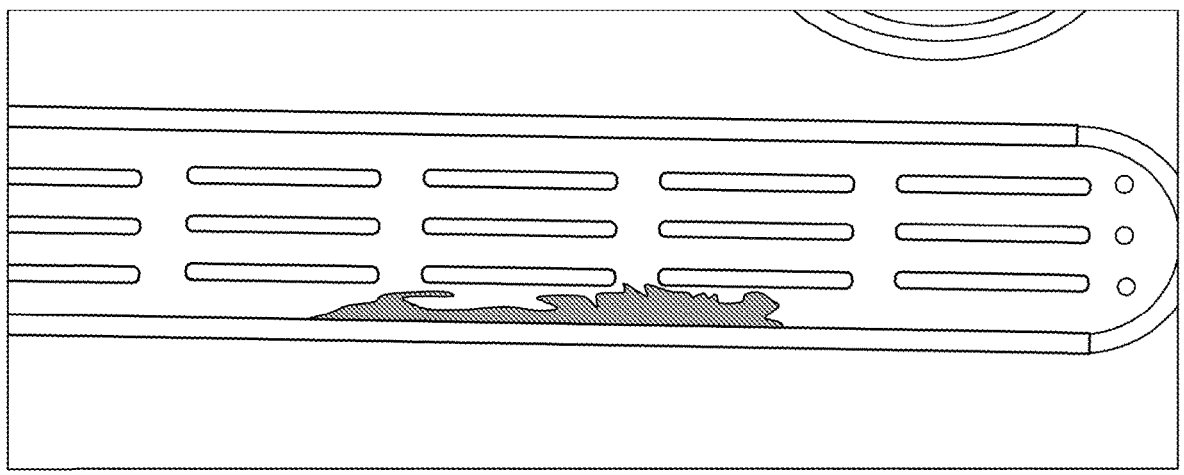
FIG. 1 shows an image of a device after attempts to magnetically load beads into plastic microwells without using a surfactant in the buffer, which lead to beads adsorbing to the surface (light gray streak in lower middle area of the array chamber).

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and relevant art and should not be interpreted in an idealized or overly formal sense unless expressly so defined herein. The terminology used in the description of the invention herein is for the purpose of describing particular embodiments only and is not intended to be limiting of the invention. All publications, patent applications, patents and other references mentioned herein are incorporated by reference in their entirety. In case of a conflict in terminology, the present specification is controlling.

Also as, used herein, "and/or" refers to and encompasses any and all possible combinations of one or more of the associated listed items, as well as the lack of combinations when interpreted in the alternative ("or").

Unless the context indicates otherwise, it is specifically intended that the various features of the invention described herein can be used in any combination. Moreover, the present invention also contemplates that in some embodiments of the invention, any feature or combination of features set forth herein can be excluded or omitted. To illustrate, if the specification states that a complex comprises components A, B and C, it is specifically intended that any of A, B or C, or a combination thereof, can be omitted and disclaimed.

As used herein, the transitional phrase "consisting essentially of" (and grammatical variants) is to be interpreted as encompassing the recited materials or steps "and those that do not materially affect the basic and novel characteristic(s)" of the claimed invention. See, In re Herz, 537 F.2d 549, 551-52, 190 U.S.P.Q. 461, 463 (CCPA 1976) (emphasis in the original); see also MPEP § 2111.03. Thus, the term "consisting essentially of" as used herein should not be interpreted as equivalent to "comprising."

It will also be understood that, as used herein, the terms "example," "exemplary," and grammatical variations thereof are intended to refer to non-limiting examples and/or variant embodiments discussed herein, and are not intended to indicate preference for one or more embodiments discussed herein compared to one or more other embodiments.

The term "about," as used herein when referring to a measurable value such as an amount or concentration and the like, is meant to encompass variations of ±20%, ±10%, ±5%, ±1%, ±0.5%, or even ±0.1% of the specified value as well as the specified value. For example, "about X" where X is the measurable value, is meant to include X as well as variations of ±20%, ±10%, ±5%, ±1%, ±0.5%, or even ±0.1% of X. A range provided herein for a measurable value may include any other range and/or individual value therein.

As used herein, the terms "increase," "increases," "increased," "increasing," "improve," "enhance," and similar terms indicate an elevation in the specified parameter of at least about 2%, 5%, 10%, 15%, 20%, 25%, 30%, 35%, 40%, 45%, 50%, 55%, 60%, 65%, 70%, 75%, 80%, 85%, 90%, 95%, 100%, 150%, 200%, 300%, 400%, 500% or more.

As used herein, the terms "reduce," "reduces," "reduced," "reduction," "inhibit," and similar terms refer to a decrease in the specified parameter of at least about 2%, 5%, 10%, 15%, 20%, 25%, 30%, 35%, 40%, 45%, 50%, 55%, 60%, 65%, 70%, 75%, 80%, 85%, 90%, 95%, 97%, or 100%.

"Alkyl" as used herein alone or as part of another group, refers to a straight or branched chain saturated hydrocarbon containing from 1 to 30 carbon atoms. In some embodiments, the alkyl group may contain 1, 2, or 3 up to 4, 5, 6, 7, 8, 9, 10, 11, 12, 13, 14, 15, 16, 17, 18, 19, 20, 21, 22, 23, 24, 25, 26, 27, 28, 29, or 30 carbon atoms. Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, n-heptyl, n-octyl, n-nonyl, n-decyl, and the like. "Lower alkyl" as used herein, is a subset of alkyl and refers to a straight or branched chain saturated hydrocarbon group containing from 1 to 4 carbon atoms. Representative examples of lower alkyl include, but are not limited to, methyl, ethyl, n-propyl, iso-propyl, n-butyl, iso-butyl, tert-butyl, and the like. In some embodiments, alkyl or lower alkyl may be substituted with one or more groups, optionally one or more groups selected from polyalkylene oxides (such as PEG), halo (e.g., haloalkyl), alkyl, haloalkyl, alkenyl, alkynyl, cycloalkyl, cycloalkylalkyl, aryl, arylalkyl, heterocyclo, heterocycloalkyl, hydroxyl, alkoxy (thereby creating a polyalkoxy such as polyethylene glycol), alkenyloxy, alkynyloxy, haloalkoxy, cycloalkoxy, cycloalkylalkyloxy, aryloxy, arylalkyloxy, heterocyclooxy, heterocyclolalkyloxy, mercapto, alkyl-S(O)m, haloalkyl-S(O)m, alkenyl-S(O)m, alkynyl-S(O)m, cycloalkyl-S(O)m, cycloalkylalkyl-S(O)m, aryl-S(O)m, arylalkyl-S(O)m, heterocyclo-S(O)m, heterocycloalkyl-S(O)m, amino, carboxy, alkylamino, alkenylamino, alkynylamino, haloalkylamino, cycloalkylamino, cycloalkylalkylamino, arylamino, arylalkylamino, heterocycloamino, heterocycloalkylamino, disubstituted-amino, acylamino, acyloxy, ester, amide, sulfonamide, urea, alkoxyacylamino, aminoacyloxy, nitro or cyano where m=0, 1, 2 or 3.

"Aryl" as used herein alone or as part of another group, refers to a monocyclic carbocyclic ring system or a bicyclic carbocyclic fused ring system or higher having one or more aromatic rings. Representative examples of aryl include, azulenyl, indanyl, indenyl, naphthyl, phenyl, tetrahydronaphthyl, and the like. In some embodiments, aryl may be substituted with one or more groups, optionally one or more groups such as those described in connection with alkyl and lower alkyl above.

Provided according to embodiments of the present invention are coating reagents used to form a coating and/or film on a surface of a substrate (e.g., a plastic substrate surface). One or more (e.g., 1, 2, 3, 4, 5, or more) coating reagents may be used to provide a coating and/or film on a surface of a substrate and/or used in a method of the present invention. In some embodiments, compositions including a coating reagent are provided. The composition may be in any suitable form such as, for example, in the form of a solution, colloid, emulsion, gel, or supercritical fluid. In some embodiments, the composition is a liquid. A composition can be used to provide a coating of the coating reagent on a surface of a substrate. In some embodiments, the coating may be in the form of a film on a surface of the substrate. A "film" as used herein refers to a layer of a coating reagent as described herein provided on a surface of a substrate. A "film" as used herein may comprise at least about 50%, 55%, 60%, 65%, 70%, 75%, 80%, 85%, 90%, 95%, or 100% of the coating reagent by weight of the film and/or may comprise less than about 20% of a solvent by weight of the film. In some embodiments, a film is dry and/or there is no visible composition and/or solvent on the film and/or surface of the substrate. However, a method and/or device of the present invention can include contacting the film with an aqueous composition and/or oil. A device of the present invention may be formed by a method of the present invention and includes a film of the present invention.

In some embodiments, a composition of the present invention comprises a coating reagent and a solvent. The coating reagent may be present in the composition in an amount from about 0.01% or 0.1% to about 1%, 2%, 3%, 4%, or 5% by volume of the solvent such as, for example, about 0.01% to about 2%, or about 0.1% to about 1% by volume of the solvent. In some embodiments, the coating reagent is present in the composition in an amount of about 0.01% 0.02%, 0.03%, 0.04%, 0.05%, 0.06%, 0.07%, 0.08%, 0.09%, 0.1%, 0.2%, 0.3%, 0.4%, 0.5%, 0.6%, 0.7%, 0.8%, 0.9%, 1%, 1.5%, 2%, 2.5%, 3%, 3.5%, 4%, 4.5%, or 5% by volume of the solvent. In some embodiments, the coating reagent is present in the composition in an amount of about 1% by volume of the solvent. In some embodiments, the concentration of the coating reagent provided onto a surface of a substrate may provide a film of a certain thickness. For example, a composition including more coating reagent may provide a thicker film compared to the thickness of a film prepared from a composition comprising less coating reagent.

The coating reagent may be at least partially dissolved in a solvent. In some embodiments, at least about 50%, 55%, 60%, 65%, 70%, 75%, 80%, 85%, 90%, 95%, or 100% of a coating reagent is dissolved in a solvent. In some embodiments, a coating reagent may be suspended in a solvent, form micelles in a solvent, and/or exist in micelles in a solvent.

A solvent used in a composition, device, and/or method of the present invention may have a vapor pressure of at least about 25 mm Hg at 20° C. such as, for example, at least about 30, 40, 50, 75, 100, 250, 500, or 750 mm Hg at 20° C. or more. In some embodiments, the solvent may have vapor pressure from about 25 mm Hg at 20° C. to about 40, 50, 75, 100, 250, 500, or 750 mm Hg at 20° C. In some embodiments, the solvent has a vapor pressure of greater than about 1 atmosphere at 20° C. In some embodiments, the solvent has a vapor pressure of less than about 50 mm Hg at 25° C. Vapor pressure may be determined using methods known to those of skill in the art such as, for example, those described in Flaningam O L; *J Chem Eng Data* 31: 266-72 (1986). In some embodiments, the solvent may be a gas at standard ambient room temperature and pressure (i.e., 0° C. and 1 bar, respectively) and a liquid below standard ambient room temperature and pressure.

In some embodiments, a solvent used in a composition, device, and/or method of the present invention may have a contact angle on a surface of a substrate (e.g., a hydrophobic substrate such as, e.g., COP) of about 5° or less when 5 microliters of the solvent are placed on the surface, optionally at about 25° C. In some embodiments, the solvent may have a contact angle on a surface of a substrate of about 5°, 4°, 3°, 2°, 1°, 0.5° or less when 5 microliters of the solvent are placed on the surface, optionally at about 25° C. In some embodiments, the solvent may have a contact angle on a surface of a substrate of about 0° when 5 microliters of the solvent are placed on the substrate, optionally at about 25° C.

A solvent used in a composition, device, and/or method of the present invention may have a viscosity of less than about 0.7, 0.6, 0.5, 0.4, 0.3, 0.2, or 0.1 centistokes at 25° C. In some embodiments, the solvent may have a viscosity from about 0.1, 0.2, or 0.3 to about 0.4, 0.5, 0.6, or 0.7 centistokes at 25° C. Viscosity may be determined using methods known to those of skill in the art such as, for example, those described in Mazzoni S M et al; pp 53-81 in Handbook Environ Chem, Vol 3. Chandra G, ed. Berlin, Germany: Springer (1997).

In some embodiments, a solvent used in a composition, device, and/or method of the present invention may be immiscible with water and/or may be nonpolar. In some embodiments, a solvent used in a composition, device, and/or method of the present invention has a solubility in water of less than about 1.5 mg/L or less than about 1 mg/L at 25° C. The solvent may have a solubility in water of about 0.01, 0.1, or 0.5 mg/L to about 0.7, 1, or 1.5 mg/L at 25° C. Solubility in water of a solvent may be determined using methods known to those of skill in the art such as, for example, those described in Kochetkov A et al; *Environ Toxicol Chem* 20: 2184-88 (2001).

A solvent of the present invention may be hydrophobic. In some embodiments, the solvent may have an octanol/water partition coefficient (log P) of about 1, 2, 3, 4, 5, 6, 7, 8, or 9. In some embodiments, the solvent may have an octanol/water partition coefficient (log P) of about 3, 4, 5, 6, 7, 8, or greater. In some embodiments, the solvent may have an octanol/water partition coefficient of about 3 or 4 to about 5, 6, or 7.

One or more (e.g., 1, 2, 3, 4, 5, or more) solvents may be present in a composition of the present invention in any suitable amount. For example, in some embodiments, a composition of the present invention may comprise a solvent in an amount of about 1%, 5%, or 10% to about 50%, 75%, 90%, 95%, 99%, or 99.99% by volume of the composition. In some embodiments, the composition comprises two or more solvents and the solvents may not form a single liquid phase liquid and/or may function as a dispersed solution, a colloid, an emulsion, a gel, or supercritical fluid. Exemplary solvents that may be used in a composition, device, and/or method of the present invention include, but are not limited to, cyclomethicones; dimethicones; polysiloxanes; polysilanes; fluorosiloxanes; fluorosilanes; perfluorocarbons (e.g., perfluorohexane ($C_6F_{14}$); perfluorosiloxanes; perfluorohydrocarbons; cyclicfluorocarbons; quaternary siloxanes; supercritical fluids; solvents described in Flaningam O L; *J Chem Eng Data* 31: 266-72 (1986); 1,1,1,2,2,3,4,5,5,5-decafluoropentane ($CF_3CHFCHFCF_2CF_3$) such as, e.g., commercially available from DuPont™ under the tradename VERTREL®; DUPONT™ KRYTOX® Solvent; and any combination thereof. In some embodiments, a composition of the present invention comprises a cyclomethicone. Exemplary cyclomethicones include, but are not limited to, hexamethylcyclotrisiloxane, octamethylcyclotetrasiloxane, decamethylcyclopentasiloxane, and/or do decamethylcyclohexasiloxane. In some embodiments, a composition of the present invention comprises a perfluorocarbon, optionally a perfluorocarbon oil. In some embodiments, a composition of the present invention comprises perfluoropolyether (PFPE) such as, for example, a PFPE oil. In some embodiments, a composition of the present invention may comprise PFPE having a structure represented by Formula I:

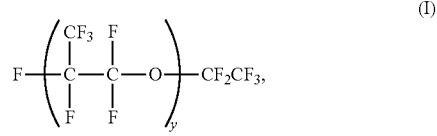

wherein y is an integer from 1 to 9.

In some embodiments, a composition of the present invention may comprise a solvent (e.g., PFPE) including carbon in an amount of about 10% to about 30% by weight of the solvent, oxygen in an amount of about 5% to about 15% by weight of the solvent, and fluorine in an amount of about 60% to about 80% by weight of the solvent. In some embodiments, a composition of the present invention may comprise a solvent (e.g., PFPE) including about 21.6% carbon by weight of the solvent, about 9.4% oxygen by weight of the solvent, and about 69.0% fluorine by weight of the solvent.

One or more (e.g., 1, 2, 3, 4, 5, or more) organosilicon(s) may be present in a composition of the present invention. Organosilicons include, but are not limited to, cyclomethicones, dimethicones, polysiloxanes, polysilanes, fluorosiloxanes, fluorosilanes, perfluorosiloxanes, and quaternary siloxanes. In some embodiments, the composition comprises a siloxane such as, e.g., a polysiloxane, optionally a linear polydisiloxane, that is optionally substituted with one or more alkyl group(s) and/or halogen(s) (e.g., fluorine). In some embodiments, the solvent may be an organosilicon having a structure of Formula II:

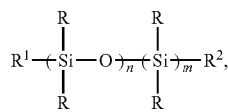

(II)

wherein:
each R is independently selected from hydrogen and a substituted or unsubstituted alkyl;
$R^1$ and $R^2$ are each independently selected from a bond, hydrogen, and a substituted or unsubstituted alkyl, optionally wherein $R^1$ and $R^2$ taken together form a ring;
n is an integer from 1 to 20;
m is an integer of 0 or 1.

A compound of Formula II may be substituted with one or more halogen(s) such as fluorine, chlorine, bromine, and/or iodine. In some embodiments, a compound of Formula II may be substituted with at least one fluorine. In some embodiments, $R^1$ and $R^2$ in a compound of Formula II are each a bond and together form a ring, optionally wherein m is 0. In some embodiments, each of R, $R^1$, and $R^2$ is a substituted or unsubstituted alkyl, optionally a substituted or unsubstituted lower alkyl. In some embodiments, each of R, $R^1$, and $R^2$ is a substituted lower alkyl, optionally wherein each of R, and $R^2$ is a substituted lower alkyl with each being substituted with at least one fluorine. A compound of Formula II containing one or more alkyl groups may be less reactive than a compound comprising a hydrogen bonded to silicon. In some embodiments, R, $R^1$, and $R^2$ are the same (e.g., all methyl or all ethyl). In some embodiments, the composition comprises hexamethyldisiloxane and/or octamethyltrisiloxane.

In some embodiments, water is not added as a separate component of a composition of the present invention. As those of skill in the art will recognize, water (e.g., water vapor) may be physically and/or chemically absorbed by a composition of the present invention and/or by one or more components thereof (e.g., a solvent). In some embodiments, a composition and/or component (e.g., solvent, additive, etc.) of the present invention is anhydrous. "Anhydrous" as used herein means that the composition and/or component has a water content of less than 2% by volume of the composition and/or component such as, for example, less than about 1.5%, 1%, 0.5%, 0.1%, 0.05%, 0.01%, 0.005%, or 0.001% by volume of the composition and/or component. In some embodiments, the composition and/or component may have a water content from about 0%, 0.001%, 0.01%, or 0.1% to about 0.5%, 1%, 1.5%, or 2% by volume of the composition and/or component. In some embodiments, a composition of the present invention and/or component thereof is devoid of measurable water (i.e., 0% water by volume). In some embodiments, a composition of the present invention and/or component thereof (e.g., solvent) does not absorb water or absorbs water in an amount less than the amount absorbed by ethanol under the same conditions. Water content may be measured by methods known to those of skill in the art, such as, but not limited to, Karl Fischer titration.

A coating reagent may be miscible with a solvent in a composition of the present invention. This may aid in the composition providing a film on a surface of a substrate. In some embodiments, the coating reagent is miscible with the solvent and/or has a high solubility in the solvent.

Exemplary coating reagents include, but are not limited to, silanes, siloxanes such as, for example, trisiloxanes, tetrasiloxanes, pentasiloxanes, hexasiloxanes, and halogen (e.g., fluorine) substituted siloxanes such as, e.g., halogen (e.g., fluorine) substituted trisiloxanes, and/or halogen (e.g., fluorine) substituted hydrocarbons. In some embodiments, a coating reagent may be a siloxane having a structure of Formula III:

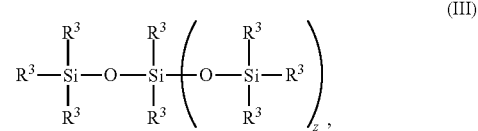

(III)

wherein:
each $R^3$ is independently selected from the group consisting of a substituted or unsubstituted alkyl and a substituted or unsubstituted aryl, and at least one $R^3$ is a substituted or unsubstituted C3-C30 alkyl or a substituted or unsubstituted aryl; and
z is an integer from 1 to 10, optionally from 1 to 6.

In some embodiments, a compound of Formula III has 1, 2, 3, 4, 5, 6, or 7 $R^3$ that is/are substituted or unsubstituted lower alkyl, optionally wherein one or more of $R^3$ are unsubstituted. In some embodiments, a compound of Formula III has 1, 2, 3, 4, 5, 6, or 7 $R^3$ that is/are methyl. In some embodiments, a compound of Formula III has 1, 2, 3, 4, 5, 6, or 7 $R^3$ that is/are a substituted or unsubstituted C6-C20 alkyl and the remaining $R^3$ is/are substituted or unsubstituted lower alkyl, optionally wherein one or more of $R^3$ are unsubstituted. In some embodiments, a compound of Formula III has 1, 2, 3, 4, 5, 6, or 7 $R^3$ that is/are a substituted or unsubstituted aryl (e.g., phenyl) and the remaining $R^3$ is/are substituted or unsubstituted lower alkyl, optionally wherein one or more of $R^3$ are unsubstituted. In some embodiments, a compound of Formula III has 2, 3, 4, 5, 6, or 7 $R^3$ that are the same. In some embodiments, a compound of Formula III is substituted with one or more halogen(s) such as fluorine, chlorine, bromine, and/or iodine. In some embodiments, a compound of Formula III may be substituted with at least one fluorine. In some embodiments, z is 1 in a compound of Formula III and is a trisiloxane. In some embodiments, z is 2, 3, or 4 in a compound of Formula III.

In some embodiments, a coating reagent may be a silane having a structure of Formula IV: $Si(R)_4$, wherein each R is independently selected from hydrogen and a substituted or unsubstituted alkyl. A compound of Formula IV may be substituted with one or more halogen(s) such as fluorine, chlorine, bromine, and/or iodine. In some embodiments, a compound of Formula IV may be substituted with at least one fluorine. In some embodiments, a compound of Formula IV has 1, 2, 3, or 4R that is/are methyl. In some embodiments, a compound of Formula IV has 1, 2, 3, or 4R that is/are a substituted or unsubstituted C3-C30 alkyl and the remaining R is/are substituted or unsubstituted lower alkyl (e.g., methyl), optionally wherein one or more of R are unsubstituted. In some embodiments, a compound of Formula IV has 2, 3, or 4R that are the same. Further exemplary coating reagents include, but are not limited to, dodecylheptamethyltrisiloxane (e.g., 3-dodecylheptamethyltrisiloxane and/or lauryl methicone), octylheptamethyltrisiloxane (e.g., 3-octylheptamethyltrisiloxane), n-octyltris(trimethylsiloxy) silane, 1,1,3,5,5-pentaphenyl-1,3,5-trimethylsiloxane, (3,3, 3-trifluoropropyl)heptamethyltrisiloxane, methyltri-n-octylsilane, octamethyltrisiloxane, ethylheptamethyltrisiloxane, propylheptamethyltrisiloxane, pentaheptamethyltrisiloxane, hexaheptamethyltrisiloxane, heptaheptamethyltrisiloxane, nonylheptamethyltrisiloxane, undecaheptamethyltrisiloxane, tridecaheptamethyltrisiloxane, tetradecylheptamethyltrisiloxane, pentadecylheptamethyltrisiloxane, hexadecylheptamethyltrisiloxane, heptadecylheptamethyltrisiloxane, octyldecylheptamethyltrisiloxane, nonadecylheptamethyltrisiloxane, duodecylheptamethyltrisiloxane, and any combination thereof.

In some embodiments, a hydrophilic coating and/or film may be formed with a composition of the present invention. In some embodiments, a hydrophilic coating and/or film may be prepared using a trisiloxane such as, e.g., SILWET® L-77 that has a trisiloxane functional group is linked to a hydrophilic polyethylene oxide group, which may function as a surfactant with excellent wetting properties and/or may reduce the surface tension of an aqueous composition to about that of ethanol. A solvent with more polar character (such as an alcohol) may be used to solvate and/or disperse a hydrophilic coating reagent. In some embodiments, a siloxane with long hydrophobic chains such as, e.g., a dimethylsiloxane-ethylene oxide block copolymer, may be used as a coating reagent and/or may anchor the coating reagent to a surface (e.g., a plastic surface) and/or make it more durable. Other siloxanes with desirable functional groups include, but are not limited to, 20% aminoethylaminopropylmethylsiloxane dimethylsiloxane copolymer, which may be used to provide a functionalizable coating (in this case, an amino functionalization) for additional functionalization and/or to provide a certain hydrophobicity value and/or electric charge characteristics. This may be applicable to microfluidic capillary electrophoresis, nucleic acid assays or studies and/or protein assays or studies in and/or on plastic substrates.

A coating reagent may be in any suitable form. In some embodiments, the coating reagent is in the form of a micelle, nanoparticle, quantum dot, and/or microparticle and/or is attached to a micelle, nanoparticle, quantum dot, and/or microparticle or in a micelle. The coating reagent may be compatible with a material in and/or on a surface of a substrate such as, for example, cyclic olefin polymers and/or other plastics that are negatively affected by traditional nonpolar solvents such as alkanes, chlorinated solvents, and/or aromatic solvents. In some embodiments, two or more coating reagents may be used. In some embodiments, different properties may be achieved from a mixture of coating reagents with similar and/or dissimilar properties. In some embodiments, a coating reagent that is not compatible with a substrate in bulk may be rendered compatible by anchoring and/or attaching the coating reagent to an inert microparticle or nanoparticle. For example, while octane as a bulk liquid can dissolve or begin to solvate a cyclic olefin polymer substrate, micro- or nanoparticles functionalized with octane can be applied to the cyclic olefin polymer substrate surface without solvating or damaging it.

A coating reagent of the present invention may be retained on and/or bound to a surface of a substrate (e.g., a plastic surface), optionally during and/or after exposure to a flowing aqueous composition optionally including a surfactant. In some embodiments, the coating reagent may be dissolved and/or suspended in a solvent that does not damage the plastic, may have a low contact angle (e.g., less than about 5°) on the substrate surface which may provide good wetting and/or a thin film of the coating reagent that optionally does not dewet and/or bead up upon the surface before oil sealing, and/or has chemical compatibility with both the substrate surface (e.g., a plastic surface) and the assay chemistry. In some embodiments, a solvent of the present invention is able to dissolve and/or suspend the coating reagent, has the ability to wet the substrate surface (e.g., a plastic surface), has a relatively high vapor pressure (as compared to the coating reagent), and/or has a chemical compatibility with the substrate such that it does not damage and/or disadvantageously alter the substrate or its properties. In some embodiments, the solvent and/or coating reagent have low toxicity, low cost, ease of application, chemical stability, and/or are relatively inert.

A coating reagent and/or composition of the present invention can be used to provide a coating and/or film of the coating reagent on a surface of a substrate. In some embodiments, the coating and/or film may be formed from the coating reagent and/or composition, optionally in the form of a solution, prior to packaging the substrate, prior to adding an aqueous composition (e.g., an aqueous buffer) to the substrate and/or prior to performing a reaction on the substrate. In some embodiments, the coating reagent and/or composition may be added to the substrate after an aqueous composition, optionally containing a surfactant, is added to the substrate and before a sealing oil is added to the substrate.

In some embodiments, the coating may be in the form of a film on the surface of the substrate. The coating and/or film may comprise the coating reagent, which may be covalently or noncovalently bound to the surface. The coating reagent may include at least one hydrophobic moiety (e.g., an alkyl moiety) and the at least one hydrophobic moiety may bind and/or interact with the surface of the substrate. The surface of the substrate may be hydrophobic and/or polymeric. In some embodiments, the surface of the substrate may comprise silicon and/or glass. In some embodiments, the surface of the substrate comprises cyclic olefin copolymer (COC), cyclic olefin polymer (COP), polystyrene, polypropylene, polyethylene, polyethylene terephthalate, polyvinyl chloride, polyepoxide, polyester, polyamide, polyimide, polyurethane, polyvinylidene chloride, acrylonitrile butadiene styrene, polytetrafluoroethylene, polyetheretherketone, polyetherimide, polylactic acid, polysulfone, polyfuran, polycarbonate, polyacrylate, fluoropolymer, silicone, glass, silicon, metal, and/or any combination thereof. In some embodiments, the surface of the substrate comprises COC and/or COP. In some embodiments, the substrate surface and/or substrate is/are optically pure at desired wavelengths (optionally over a wavelength range of about 300 nm to about 750 nm), comprise low cost materials, comprise materials that can be injection molded and/or embossed at tight tolerances and/or on micrometer scale critical dimensions, comprise materials that have temperature stability (optionally over the range of about −40° C. to about 130° C.), and/or comprise materials that have low vapor permeability.

According to some embodiments of the present invention, provided are methods of forming a film on a surface of a substrate, the method comprising contacting a surface of a substrate with a coating reagent; and forming a film of the coating reagent on the surface of the substrate. In some embodiments, the coating reagent may be used as a pure reagent or a mixture of coating reagents, without dilution into a solvent. In some embodiments, the surface is contacted with a composition comprising the coating reagent. "Contacting" as used herein refers to placing, covering, spraying, spreading, pouring, submerging, and/or the like a coating reagent and/or composition of the present invention on a surface of a substrate. In some embodiments, the coating reagent and/or composition contacts at least about 50%, 55%, 60%, 65%, 70%, 75%, 80%, 85%, 90%, 95%, or 100% of the surface of the substrate to be coated with the coating reagent and/or composition. In some embodiments, the surface contacted with the coating reagent and/or composition and/or the surface that includes a film of the present invention is only a portion of the substrate and/or only a portion (e.g., about 5%, 10%, 20%, 30%, 40%, 50%, 60%, 70%, 80%, 90%, or 95%) of the total surface area of the substrate. In some embodiments, the surface contacted with a coating reagent and/or composition of the present invention is about all (e.g., about 100%) or at least about 75%, 80%, 85%, 90%, 95%, or 97% of the total surface area including a film of the present invention.

In some embodiments, the substrate includes a microwell reaction device comprising an array chamber, optionally an array chamber comprising a plastic surface. The array chamber can comprise a plurality wells each having volume from about 10 attoliters to about 100 microliters. All or a portion of the surfaces of the array chamber may be contacted with a coating reagent and/or composition of the present invention and/or may include a film of the present invention. When the surface of the array chamber is contacted with a coating reagent and/or composition of the present invention, the contacting may comprise filling the array chamber with the coating reagent and/or composition. In some embodiments, the coating reagent and/or composition fills and/or wets at least about 50%, 55%, 60%, 65%, 70%, 75%, 80%, 85%, 90%, 95%, or 100% of the volume and/or total surface area of the array chamber. In some embodiments, a substrate, device, and/or method of the present invention may include, but is not limited to, one (e.g., a device and/or method) as described in U.S. Application Publication No. 2015/0211048, International Application No. PCT/US2016/042913, International Application No. PCT/US2016/043463, and International Application No. PCT/US2016/055407, the contents of each of which are incorporated herein by reference in their entirety.

A device and/or method of the present invention may be used to perform any suitable reaction such as, but not limited to, assays involving biomolecules such as, e.g., PCR reactions; spatial array-based assays such as, e.g., reconfigurable multi-element diagnostic (ReMeDx) assays, singleplex reactions in a compact array (SiRCA), and single molecule array (Simoa) assays; assays including aqueous reaction compositions; assays performed on plastic substrates, and/or assays described in International Publication No. WO 2013/176767, the contents of which are incorporated herein by reference. In some embodiments, a device and/or method of the present invention may be used in loading and/or sealing beads in an array such as, e.g., plastic arrays (e.g., COP plastic arrays). In some embodiments, the presence of a film of the present invention may enhance or improve an assay and/or reaction. For example, in some embodiments, a protein blocker (e.g., bovine serum albumin) may be removed from a reaction composition (e.g., from a PCR master mix) without negatively affecting the assay/reaction (e.g., without losing PCR signal) and/or may increase the efficiency of the assay/reaction (e.g., increase signal) compared to the efficiency with the protein blocker. The presence of the film may reduce adsorption of nucleic acids, enzymes, surfactants, and/or other chemical reagents (e.g. magnesium, sodium, potassium, chloride, sulfate, acetate, and Tris ions) to the substrate.

One or more layer(s) of a coating reagent and/or composition of the present invention may be provided onto a surface of a substrate. In some embodiments, the coating reagent and/or composition is spread over the surface, optionally in an even layer and/or a uniform layer. "Uniform" as used herein refers to a measurable value that varies by less than ±20% (e.g., ±10%, ±5%, or less), optionally from an average of measurable values.

In some embodiments, a film of the present invention is formed on a surface by drying the coating reagent and/or composition on the surface. The coating reagent and/or composition may be dried using any method known to those of skill in the art such as, but not limited to, evaporation. In some embodiments, at least one component of the composition (e.g., the solvent) may be evaporated from the surface of the substrate, optionally using a pressure differential (e.g., vacuum and/or air pressure). The coating reagent and/or composition may be dried until there is no visible coating reagent and/or composition on the surface of the substrate. In some embodiments, prior to drying the coating reagent and/or composition, at least a portion (e.g., about 10%, 20%, 30%, 40%, 50%, 60%, 70%, 80%, 90%, or more) of the coating reagent and/or composition is removed from the substrate.

In some embodiments, the coating reagent and/or composition may be added to a microfluidic device after an aqueous solution is added, optionally after loading a microwell array with beads, and prior to loading of a sealing oil. The coating reagent and/or composition may act as a plug of liquid that precedes the flow of a sealing oil over the substrate, such that the coating reagent is caused to flow over the substrate and coats it before the sealing oil follows it. In some embodiments, a microfluidic device may contain an aqueous solution (optionally including a surfactant) prior to adding and/or flowing a coating reagent into the microfluidic device.

A film of the present invention may have a thickness of from about 1, 10, 50, 100, or 500 nm to about 1, 10, 50, 100, 200, 300, 400, or 500 micron(s). In some embodiments, a film of the present invention has a thickness of about 1, 50, 100, 200, 300, 400, 500, 600, 700, 800, 900, or 1000 nm or about 5, 10, 50, 100, 200, 300, 400, or 500 microns. The film may have a uniform thickness over at least about 50%, 60%, 70%, 80%, 90%, 95%, or 100% of the surface of the area of the substrate on which it is provided. In some embodiments, the film has a thickness that is greater than a molecular layer of the coating reagent on the surface of the substrate.

In some embodiments, the film may have a different thickness in one or more locations on the substrate surface compared to another location. For example, when the substrate surface comprises one or more depression(s) that extend in the vertical direction below the horizontal plane of the surface such as, e.g., a plurality of wells and/or pores, the film may have a greater thickness on a surface of the depression (e.g., well) compared to the thickness of the film on the horizontal plane of the surface (e.g., the surface extending between two or more wells). In some embodiments, the thickness of the film on a surface of a depression may be greater than the thickness of the film on the horizontal plane of the surface by at least about 5%, 10%, 20%, 30%, 40%, 50%, 60%, or more.

In some embodiments, the film may be used in predetermined areas of the substrate to alter the properties of the substrate in those locations only. One or more applications of one or more coating reagents, compositions, and/or films of the present invention may be used to selectively pattern the substrate so that different regions of the substrate have different properties. A non-limiting example includes controlling wetting of a microfluidic device by capillary action by adding a coating reagent and/or composition that leaves a hydrophobic film on the surface of certain channels to make them more hydrophobic while adding a different coating reagent and/or composition to other channels to make them hydrophilic. Patterning of a substrate with coating reagent may be achieved by any method known to those skilled in the art including, but not limited to, photolithography, spraying, liftoff of mask(s), a partial occlusion by a stencil, capillary action, and/or pressure driven flow.

The concentration of a coating reagent in a film of the present invention may be uniform across the substrate surface. In some embodiments, the film may have a different concentration of a coating reagent in one or more locations on the substrate surface compared to another location. For example, when the substrate surface comprises one or more depressions that extend in the vertical direction below the horizontal plane of the surface such as, e.g., a plurality of wells and/or pores, the film may have a greater concentration of a coating reagent on a surface of the depression (e.g., well) compared to the concentration of the coating reagent on the horizontal plane of the surface (e.g., the surface extending between two or more wells). In some embodiments, the concentration of a coating reagent on a surface of a depression may be greater than the concentration of the coating reagent on the horizontal plane of the surface by at least about 5%, 10%, 20%, 30%, 40%, 50%, 60%, or more.

A film of the present invention may improve at least one surface property of the substrate. In some embodiments, a film and/or method of the present invention improves a surface property of a substrate that improves loading of a bead into a depression and/or well in the substrate surface and/or improves oil sealing (e.g., immiscible oil sealing) of an aqueous composition in a depression and/or well of the substrate surface, optionally compared to the substrate surface without the film. In some embodiments, the film may increase the hydrophobicity of a surface of a substrate. In some embodiments, hydrophobicity of the surface may be increased by at least about 5%, 10%, 15%, 20%, 25%, 30%, 35%, 40%, 45%, 50%, 55%, 60%, 65%, 70%, 75%, 80%, 85%, 90%, 95%, 100%, 150%, 200% or more compared to the hydrophobicity of the surface in the absence of the film and/or prior to a method of the present invention.

Figure 3:
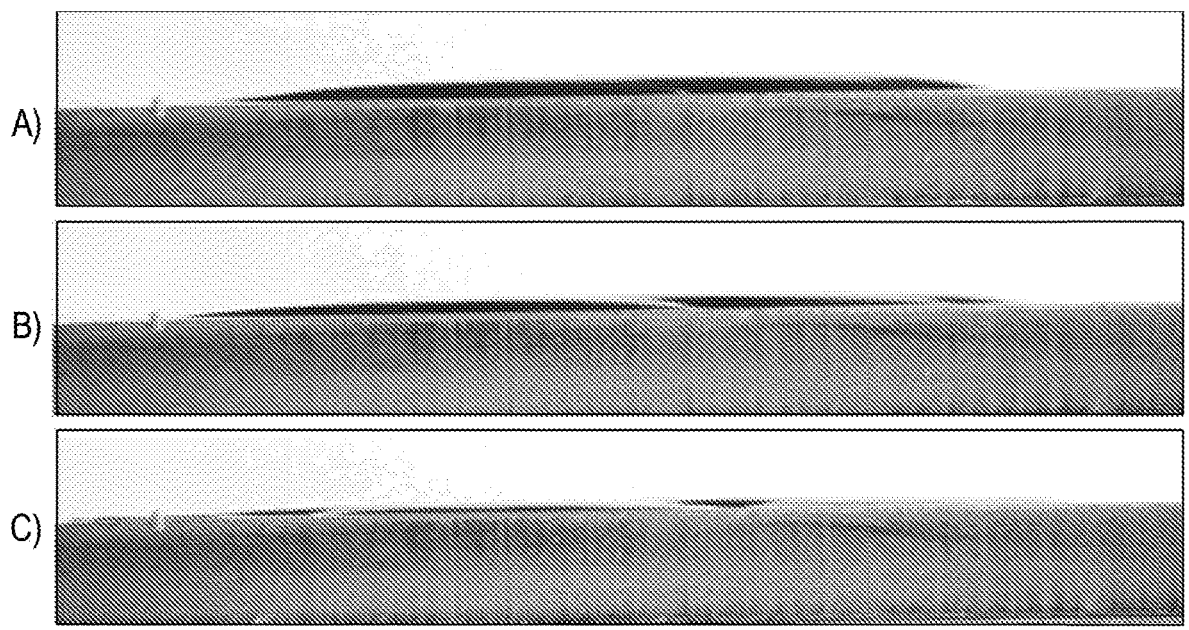
FIG. 3 shows side view images of DuPont™ KRYTOX® GPL 104 PFPE oil on a native COP surface after A) 3 min, B) 5 min, and C) 10 min Note that the oil spreads out over the substrate. Irregular spreading (branching) can be seen as the oil continues to spread out over the COP surface. Also shown are images of DuPont™ KRYTOX® GPL 104 PFPE oil on a COP surface treated with 3-dodecylheptamethyltrisiloxane (1% by volume) in hexamethyldisiloxane D) upon application, E) after 5 min, and then F) after more than 10 min. Unlike on the native COP surface, no further spreading beyond that noted upon the initial application was detected on the treated COP surface.
Figure 3:
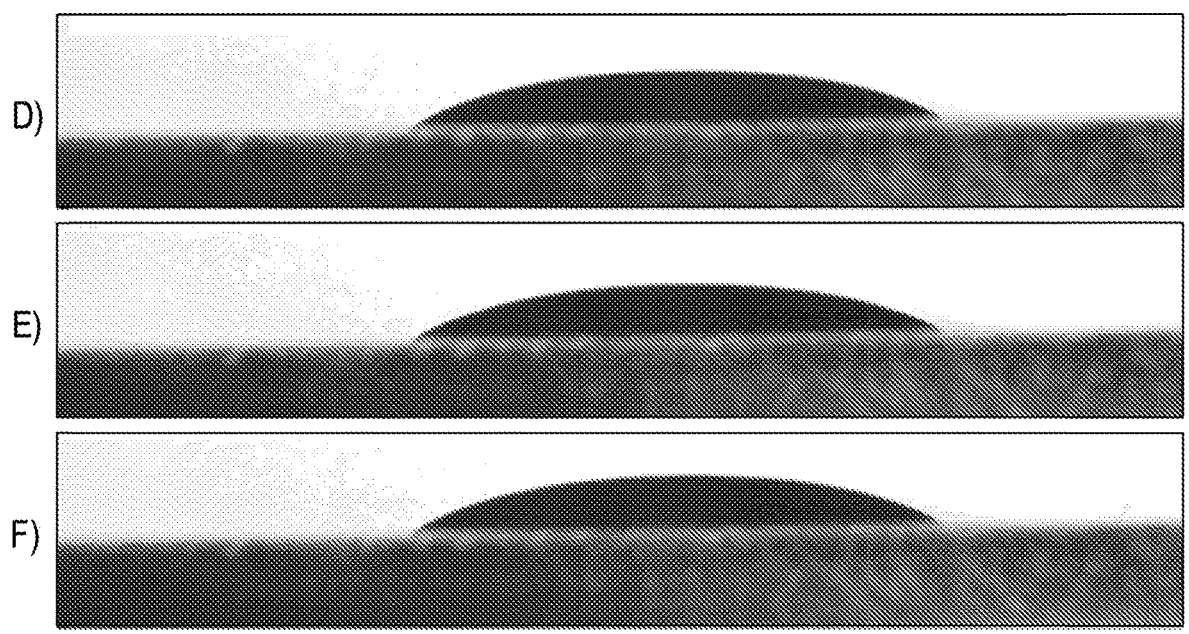

In some embodiments, a film of the present invention may increase the fluorocarbon-phobicity of a surface of a substrate. "Fluorocarbon-phobicity" as used herein refers to the tendency of a fluorocarbon (e.g., a fluorocarbon sealing oil) to repel from a surface or film or to not wet and/or not mix with the surface or film. For example, a substrate surface having a greater fluorocarbon-phobicity has a higher contact angle for a fluorocarbon droplet (e.g., about 5 µL) than a different substrate surface that has a lower contact angle for the same fluorocarbon droplet. In some embodiments, fluorocarbon-phobicity of the surface may be increased by at least about 5%, 10%, 15%, 20%, 25%, 30%, 35%, 40%, 45%, 50%, 55%, 60%, 65%, 70%, 75%, 80%, 85%, 90%, 95%, 100%, 150%, 200% or more compared to the fluorocarbon-phobicity of the surface in the absence of the film and/or prior to a method of the present invention. In some embodiments, a film of the present invention increases the fluorocarbon-phobicity to an extent such that a fluorocarbon (e.g., a fluorocarbon sealing oil) does not wet or does not completely wet the surface of the substrate on which the film is provided. For example, as shown in FIG. 3, DuPont™ KRYTOX® GPL 104 PFPE oil, when placed on a COP surface including a film prepared from a composition comprising 3-dodecylheptamethyltrisiloxane (1% by volume) in hexamethyldisiloxane, did not spread beyond the surface covered upon the initial application and thus did not completely wet the surface of substrate including the film. In contrast, as shown in FIG. 3, the PFPE oil did spread on the native COP surface.

Upon exposure to an aqueous composition (e.g., water and/or an aqueous buffer) optionally comprising a surfactant, a film of the present invention may remain on the surface of the substrate, meaning that the film does not dewet, bead up, become discontinuous, and/or bubble. In some embodiments, the film may be in contact with an aqueous composition optionally comprising a surfactant for about 30 minutes to about 1, 2, 3, or 4 hours or more and may remain on the surface. In some embodiments, at least about 50%, 55%, 60%. 65%, 70%, 75%, 80%, 85%, 90%, 95%, 97%, 98%, 99%, or 100% of the film remains on the substrate surface after being exposed to an aqueous composition optionally comprising a surfactant for about 30 minutes to about 1, 2, 3, or 4 hours or more. In some embodiments, a surfactant is present in an aqueous composition as described herein such as, for example, in an amount of about 0.001%, 0.05%, 0.01% or 0.1% to about 1%, 5%, 10%, or 15% by weight of the aqueous composition. Exemplary surfactants include, but are not limited to, hydrophilic polymers, TWEEN® (e.g. TWEEN® 20), poloxamers (e.g. poloxamer 188, poloxamer 407), BRIJ®, SILWET® (e.g. SILWET L-77), sodium dodecylsulfate, alkylglucopyranosides, and/or CHAPS detergent. In some embodiments, an aqueous composition comprises sodium dodecylsulfate, alkylglucopyranosides and/or CHAPS.

In some embodiments, a film of the present invention may prevent an aqueous composition or components of the composition, optionally including a surfactant, from adhering and/or adsorbing to the surface of a substrate. In some embodiments, a film of the present invention reduces the amount of an aqueous composition, optionally including a surfactant, that adheres and/or adsorbs to the surface of the substrate such as, for example, compared to the amount of the aqueous composition that adheres and/or adsorbs to the surface without the film. The film may reduce the amount of the aqueous composition that adheres to the surface during oil sealing such as with an immiscible sealing oil. In some embodiments, a film of the present invention may prevent adsorption of a surfactant present in an aqueous composition, prevent or allow the dissolution of surfactant residue so that it cannot interact with the aqueous composition, provide an advantageous interaction between the immiscible oil and the coating that allows for improved removal of the aqueous composition, and/or reduces the surface energy which may reduce the interaction between the aqueous composition and the surface.

A method of the present invention may comprise contacting (e.g., adding) an oil (e.g., an immiscible sealing oil) to the film on the surface of the substrate, optionally after exposure of the film to an aqueous composition that may include a surfactant. The oil may be contacted to the surface with the film in order to seal a depression and/or to seal a plurality of depressions and/or wells from each other. When the substrate surface comprises a plurality of depressions and/or wells and an aqueous composition (optionally including a surfactant) is included therein, less than about 20%, 15%, 10%, or 5% of the depressions and/or wells may be bridged by an aqueous solution and/or fluidically connected by an aqueous solution after sealing the depressions and/or wells with an oil.

In some embodiments, a film of the present invention may increase the contact angle for an oil droplet of 5 μL on a surface of a substrate including the film. In some embodiments, the contact angle of the oil droplet on the surface may be increased by at least about 5%, 10%, 15%, 20%, 25%, 30%, 35%, 40%, 45%, 50%, 55%, 60%, 65%, 70%, 75%, 80%, 85%, 90%, 95%, 100%, 150%, 200% or more compared to the contact angle of the oil droplet on the surface of the substrate in the absence of the film and/or prior to a method of the present invention. In some embodiments, the oil droplet is a sealing oil droplet. The film may prevent and/or inhibit an oil from fully wetting the surface of the substrate. An oil droplet of 5 μL may have a contact angle on a film of the present invention that is on a surface of a substrate as described herein (e.g., a COP or COC surface) of about 0.5°, 1°, 2°, 3°, 4°, 5°, 6°, 7°, 8°, 9°, or 10° to about 12°, 15°, 20°, 25°, 30°, 35°, 40°, 45°, 50°, 55°, 60°, 65°, 70°, or 75°, optionally at about 25° or 30°.

In some embodiments, a film of the present invention may increase the contact angle for an aqueous droplet of 5 μL on a surface of a substrate including the film. In some embodiments, the contact angle of the aqueous droplet on the surface may be increased by at least about 5%, 10%, 15%, 20%, 25%, 30%, 35%, 40%, 45%, 50%, 55%, 60%, 65%, 70%, 75%, 80%, 85%, 90%, 95%, 100%, 150%, 200% or more compared to the contact angle of the aqueous droplet on the surface of the substrate in the absence of the film and/or prior to a method of the present invention. In some embodiments, the aqueous droplet (e.g., water, an aqueous buffer, aqueous reaction mixture, etc.) comprises a surfactant. An aqueous droplet of 5 μL may have a contact angle on a film of the present invention that is on a surface of a substrate as described herein (e.g., a COP or COC surface) of about 20°, 25°, 30°, 35°, 40°, 45°, 50°, 55°, 60°, 65°, 70°, 75°, 80°, 90°, 100°, 110°, or 120° to about 125°, 130°, 140°, 150°, 160°, or 170°, optionally at about 25° C. In some embodiments, the aqueous droplet has a contact angle on a film of the present invention that is on a surface of a substrate as described herein (e.g., a COP or COC surface) of about 90° to about 100°, 110°, 120°, 130°, 140°, or 150°. In some embodiments, a film of the present invention increases the contact angle for an aqueous droplet of 5 μL on a surface of a substrate including the film above about 90°.

Figure 4:
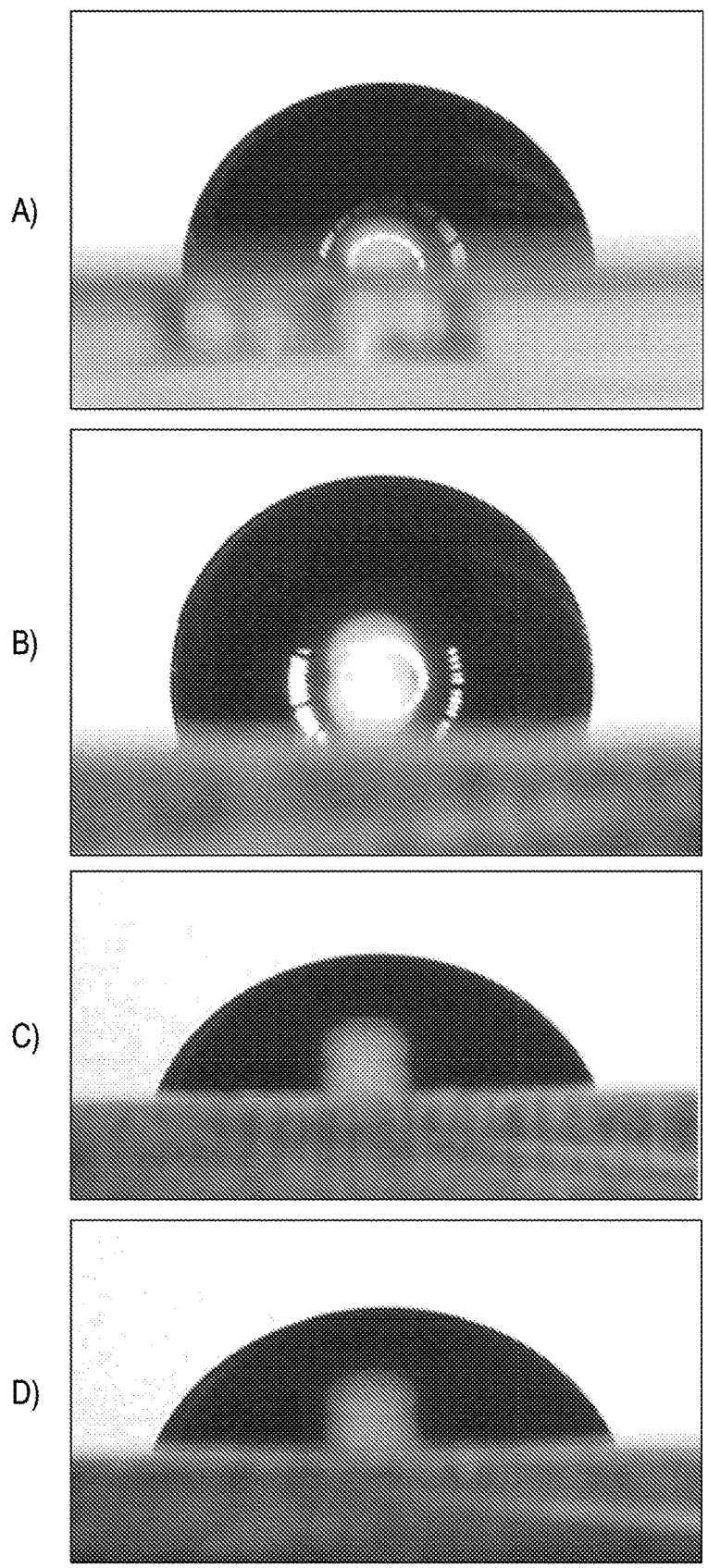
FIG. 4 shows a side view of A) a droplet (about 5 µL) of water on a COP surface and B) a droplet (about 5 µL) of water on a COP surface treated with 3-dodecylheptamethyltrisiloxane (1% by volume) in hexamethyldisiloxane. Also shown are side view images of a droplet (about 5 µL) of an aqueous buffer containing Tween 20 (a nonionic surfactant) at 0.1% by volume on C) a native COP surface and D) a COP surface treated with 3-dodecylheptamethyltrisiloxane (1% by volume) in hexamethyldisiloxane. While the surface treatment may have increased the hydrophobicity of the COP surface for water, no difference in contact angle for the aqueous buffer with surfactants was measurable in this instance.

For example, as shown in FIG. 4, when a droplet of water was placed on a COP surface including a film prepared from a composition comprising 3-dodecylheptamethyltrisiloxane (1% by volume) in hexamethyldisiloxane, the contact angle of the droplet on the surface increased compared to the contact angle for a droplet of water on a native COP surface. When a droplet of an aqueous buffer containing a nonionic surfactant was placed on a COP surface including a film prepared from a composition comprising 3-dodecylheptamethyltrisiloxane (1% by volume) in hexamethyldisiloxane, the contact angle of the droplet on the surface had no measurable difference in contact angle compared to the contact angle for a droplet of the buffer on a native COP surface.

A film of the present invention may improve aqueous dewetting of the substrate during sealing of the substrate with an oil (e.g., an immiscible oil). An "immiscible oil" as used herein refers to an oil that is immiscible with an aqueous composition such as, e.g., an aqueous reaction composition. Exemplary immiscible oils include, but are not limited to, fluorinated polymers, such as perfluoropolyethers (e.g., low molecular weight, fluorine end-capped, homopolymers of hexafluoropropylene epoxide), alkane-based oils such as mineral oil, and/or silicone oils such as polysiloxanes that may be fluorinated.

An immiscible oil can include an immiscible sealing oil such as, but not limited to, PFPE, perfluoroalkylether (PFAE), and/or perfluoropolyalkylether (PFPAE). In some embodiments, the immiscible oil is a PFPE oil available under the tradename KRYTOX® from DUPONT™ such as, but not limited to, KRYTOX® GPL 103, KRYTOX® GPL 104, and/or KRYTOX® GPL 105. In some embodiments, an immiscible oil has a structure represented by Formula V:

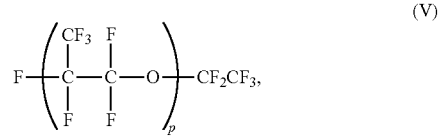

(V)

wherein p is an integer from 10 to 60.

In some embodiments, an immiscible oil (e.g., a PFPE oil) comprises carbon in an amount of about 10% to about 30% by weight of the oil, oxygen in an amount of about 5% to about 15% by weight of the oil, and fluorine in an amount of about 60% to about 80% by weight of the oil. In some embodiments, an immiscible oil (e.g., a PFPE oil) comprises about 21.6% carbon, about 9.4% oxygen, and about 69.0% fluorine, each by weight of the oil. In some embodiments, an immiscible oil can dissolve about 1 part water per hundred parts of oil or more, optionally less than about 1 part water per thousand parts of oil. In some embodiments, a mixture of an immiscible oil and water has at least a portion that phase separates because the two components are not freely soluble in one another. In some embodiments, the film may improve aqueous dewetting of the substrate during sealing of the substrate with an oil (e.g., an immiscible oil) compared to the aqueous dewetting of the substrate during sealing in the absence of the film.

A film of the present invention may reduce or prevent adherence and/or binding of a biomolecule (e.g., a protein and/or nucleic acid) to the surface of the substrate. In some embodiments, the film reduces or prevents adherence and/or binding of a biomolecule compared to the adherence of the biomolecule to the surface of the substrate in the absence of the film. The presence of the film may also reduce the adherence of enzymes, surfactants, and/or other chemical reagents (e.g. magnesium, sodium, potassium, chloride, sulfate, acetate, and Tris ions) to the substrate.

Provided according to some embodiments of the present invention are methods of improving immiscible oil sealing of an aqueous-phase reaction in a well of a plastic microfluidic device. Any suitable microwell reaction device may be used in a method of the present invention such as, for example, those having wells and/or pores having a volume from about 10 attoliters to about 100 microliters and that are formed on a mostly planar substrate. A microfluidic device used in a method of the present invention may be plastic and/or comprise a plastic surface where chemical reactions need to be isolated and/or segmented from one another. In some embodiments, a device of the present invention may be fabricated from plastic and may be coated with a layer of a coating reagent as described herein, which may improve immiscible oil sealing of aqueous reactions by reducing the number of wells fluidically connected to each other by a bridge of aqueous phase, optionally aqueous reactions including a surfactant.

In some embodiments, a film of the present invention may function as and/or be used as a blocking agent (i.e., something that reduces unwanted adsorption of molecules and/or particles to the coated substrate), and may or may not be used to aid in sealing wells and/or reactions from one another.

In some embodiments, a film and/or device of the present invention is used in a method of delivering reagents and/or target molecules of interest into reaction wells using beads (e.g., superparamagnetic beads), such as described, for example, in U.S. Application Publication No. 2015/0211048 and International Application No. PCT/US2016/042913, the contents of each of which are incorporated herein by reference in their entirety. Such a method may provide at least about 80% or more (e.g., 85%, 90%, 95%, 97%, or 100%) of the reaction wells with one bead. In some embodiments, a film of the present invention aids and/or allows for the beads to be guided toward a well and/or have decreased resistance when being moved to a well. In some embodiments, a device of the present invention may provide and/or achieve a greater ratio of beads loaded in the wells to those added to the device compared to devices that do not include a film of the present invention. In some embodiments, a device of the present invention provides and/or achieves a ratio of beads loaded in the wells to beads added to the array of about 1:1 to about 1:10. In some embodiments, a device of the present invention achieves and/or provides beads in about 50%, 60%, or 70% to about 75%, 80%, 90%, or 100% of the wells in the device and/or includes a total number of beads in the device in an amount that is the same or within about 300% of the number of wells in the device. In some embodiments, a device of the present invention achieves and/or provides beads in at least about 95% of the wells or about 100% of the wells. In some embodiments, a device of the present invention includes a total number of beads in the device in an amount that is the same or within about 300% of the number of wells in the device.

In some embodiments, a method of the present invention comprises loading wells with a bead using a magnet to collect the beads into a clump or thin line on the surface of the reaction well array containing the substrate with a film of the present invention on the surface. The collected beads are transported over the array wells by translating the magnet under the substrate. After loading the beads into wells, and optionally after an aqueous reagent solution has been added, a perfluorinated oil such as, e.g., perfluoropolyether (PFPE), perfluoroalkylether (PFAE) and/or perfluoropolyalkylether (PFPAE), is contacted to (e.g., added and/or flowed into) the array chamber to seal (e.g., isolate) the wells from one another. The oil pushes out the aqueous composition from the array chamber, but the aqueous composition is pinned and trapped inside the reaction wells. Using this approach, a majority (e.g., at least about 50%, 60%, 70%, 80%, 90%, 95%, 97%, or 100%) of the wells may be isolated from one another and/or independent reactions can proceed without cross talk caused by aqueous transfer between the wells.

Magnetically loading paramagnetic beads into reaction well arrays formed in COP plastic without a film of the present invention was found to be problematic using the native surfaces and buffers. A "native surface" as used herein refers to a surface that is not modified and/or treated with a coating reagent and/or composition of the present invention, and is devoid of a coating and/or film of the present invention. Without adding surfactant, hydrophilic polymers, or other blocking reagents to the COP chip, sealing of wells was acceptable; however, beads could not be easily transported magnetically and this led to inefficient loading into wells. The beads adsorbed to the surface and formed a distributed layer over the array substrate as shown in FIG. 1. The addition of a surfactant such as TWEEN® 20 to the buffer resulted in the beads efficiently loading into the wells and flowing freely over the surface of the plastic substrate. Unfortunately, exposure to a surfactant-containing buffer caused large patches of aqueous phase to be left on the surface of the array and on the top surface of the array chamber after immiscible oil sealing. This can be seen in FIG. 2 where a fluorescent dye present in the aqueous phase clearly shows the interfaces between phases. Attempts to improve sealing by washing away the surfactant after bead loading (but before sealing) using a buffer without surfactant were unsuccessful, and the aqueous bridging persisted. Attempts using various hydrophilic polymers were also unsuccessful due to either bead adsorption (i.e., beads sticking to the plastic substrate or each other) or aqueous bridging similar to that seen with surfactants.

Figure 5:
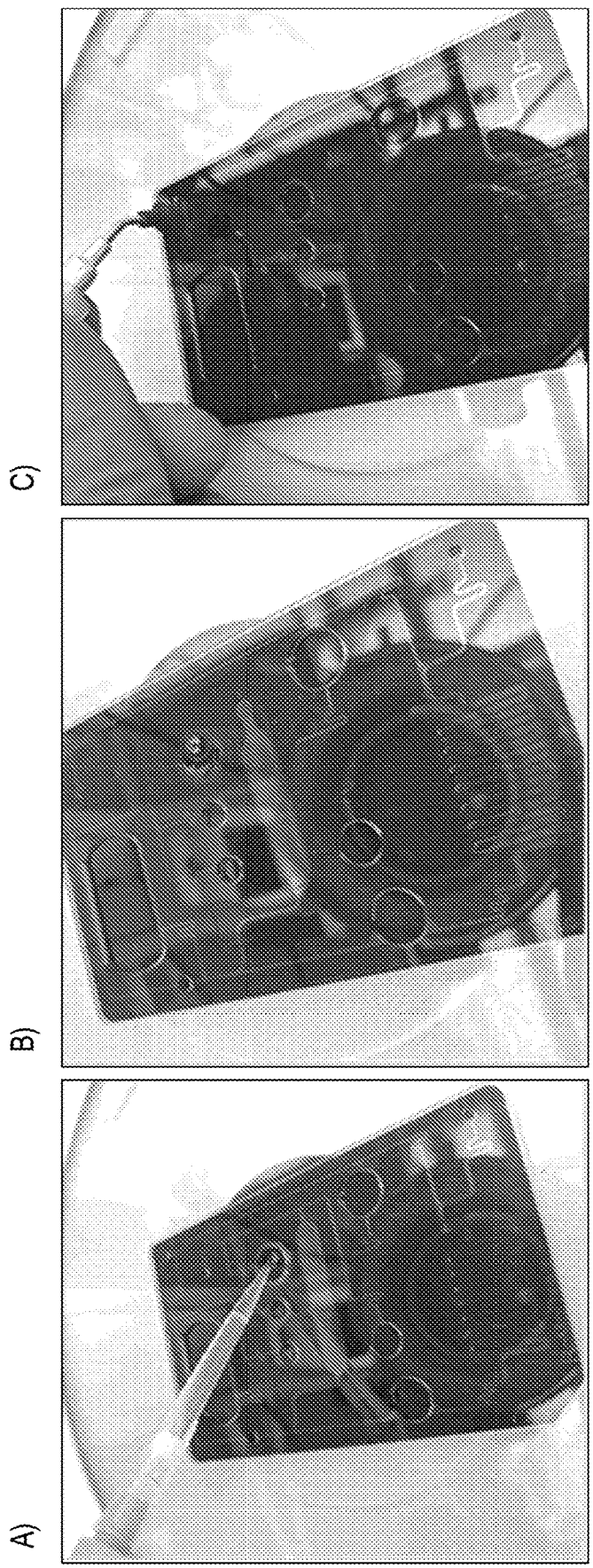
FIG. 5 shows images taken during a process of loading a composition including a coating reagent and a solvent into an array chamber of a microfluidic chip. A) Coating reagent dissolved in the solvent is added to a reservoir on the chip. B) The solution begins to fill the area to be coated via capillary action or under a pressure differential. C) The solution completely fills the area to be coated.
Figure 6:
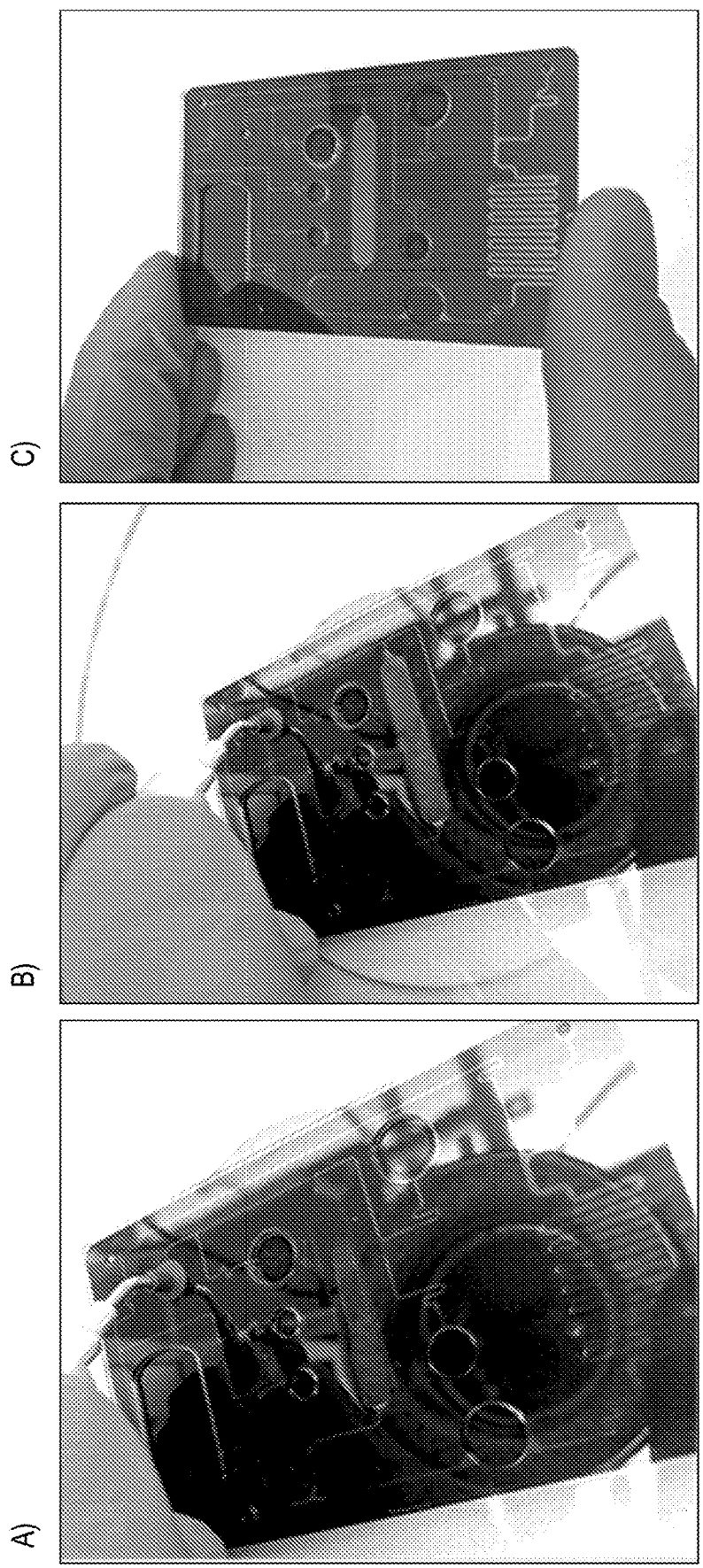
FIG. 6 shows images taken during a process of removing the composition in the chip shown in FIG. 5 to leave a layer of the coating reagent on the chip surfaces. A) A pressure differential is applied to the chip to remove the solvent media from the device. Partial vacuum is used in this example. B) The solvent is completely removed from the device until it is apparently dry. C) The coated device. The coating reagent is a thin, relatively even film that is not readily observed with the naked eye in this example, although the effects of thin-film interference may be observable at certain angles under certain lighting conditions.

In some embodiments, a method of the present invention uses a coating reagent dissolved in a solvent, optionally in an amount of about 0.01%, 0.05%, 0.1%, 0.5%, or 1% by volume of the solvent. The composition (e.g., in liquid form) is added to a plastic chip, allowed to fill the array chamber, and then removed and dried using a pressure differential (such as vacuum or air pressure) applied to a reservoir as shown in FIGS. 5 and 6. The composition may partially or completely fill and/or wet the areas of the device where the coating is desired. The composition is then removed from the chip, leaving a coating of composition from which the solvent evaporates and thereby leaving a film of the coating reagent distributed uniformly over most of the surface of the array. This approach can be referred to as the fill, evacuate, and dry (FED) method. Alternatively, or in addition, other application techniques and/or variants of this technique can be used, although modification of the composition may be needed. Such techniques and/or variants include, but are not limited to, filling the chip and then allowing the solvent to evaporate without removing the bulk of the composition from the chip. The film may also be applied by spraying the composition or the coating reagent alone over the surface to be coated. Other methods include, but are not limited to, those known to the semiconductor microfabrication industry such as, for example, spin-coating, dip coating, spread coating, vapor deposition, and/or chemical vapor deposition. In some embodiments, a supercritical solvent may be used to deposit the film, optionally in a large batch, automatable format. Automated formats to inject and/or spray the composition into the chip and remove it can be realized for commercial manufacturing applications using methods known to those skilled in the art.

In some embodiments, the film may appear to be relatively even over the flat surfaces of an array and array chamber, but more composition and/or coating reagent may be left behind in the microwells during the FED coating method. In some embodiments, there may be edge effects at the locations where the microwells meet the surface of the array, which may aid in oil sealing and/or provide for improved oil sealing.

A method of the present invention may be performed at ambient conditions. In some embodiments, a method of the present invention may be performed at conditions drier than ambient conditions, which may reduce the amount of absorbed water on a film that is on a surface of a substrate. Absorbed water may be left behind as droplets that may disturb the film and/or contribute to an uneven application of the film. In some embodiments, a method of the present invention may include one or more steps to remove or eliminate moisture in a composition of the present invention and/or that a film of the present invention is exposed to such as, but not limited to, drying over molecular sieves, dry atmosphere, and/or gas purging.

A composition, device, and/or method of the present invention may be used in any process that requires segmentation into isolated wells. The present invention is not limited to array-based sealing and may have applications in other areas such as, for example, water-in-oil droplet applications. For example, droplet generators may be coated with a coating reagent as described herein to prevent adsorption of an aqueous composition or a fluorocarbon-based oil or composition on a surface of the droplet generators such as, e.g., an aqueous composition comprising additional blocking of components such as cells, cell debris, particles, and/or other materials are contained in the aqueous phase.

In some embodiments, a composition, device, and/or method of the present invention may be useful as a blocking agent for aqueous compositions in hydrophobic microfluidic devices. In some embodiments, a PCR reaction performed on a film and/or device of the present invention may be more efficient than a device that does not include the film (e.g., a native plastic device).

A composition, device, and/or method of the present invention may improve sealing of microarrays of aqueous reactions containing surfactant on plastic microfluidic devices. The invention may be particularly useful for bead-based assays where loading (e.g., simultaneous loading) of the beads into the array using a magnet is desirable. In some embodiments, a film of the present invention comprises a hydrophobic trisiloxane including a hydrophobic functional group such as an alkyl chain and/or may be used on a surface of a COP plastic device. When applied using a plastic-compatible solvent such as, e.g., hexamethyldisiloxane, a thin and/or stable layer may be achieved that improves immiscible oil sealing of an array of aqueous reaction wells.

A film of the present invention may be stable such as, for example, to post-processing, packaging steps, shipment, and/or storage conditions. In some embodiments, the film is stable to lyophilization conditions. "Stable" as used herein means that the film remains on the surface of the substrate meaning that the film does not dewet, bead up, become discontinuous, and/or bubble to an extent greater than prior to the exposed condition(s). In some embodiments, stable refers to the film remaining uniform and/or continuous on the surface. In some embodiments, the film is stable for at least about 1, 2, 3, 4, 5, 6, 7, 8, 9, 10, 11, 12, or more days, weeks, months, and/or years, optionally in an unopened package. In some embodiments, the film is stable for at least about 1, 2, 3, 4, 5, 6, 7, 8, 9, 10, 11, 12, or more days, weeks, months, and/or years after exposure to an aqueous solution optionally including a surfactant.

The present invention is explained in greater detail in the following non-limiting examples.

EXAMPLES

Example 1

A solution of 1% 3-dodecylheptamethyltrisiloxane (commercially available from Gelest, CAS No: 139614-44-1) dissolved in hexamethyldisiloxane was prepared. About 45 µL of the solution was pipetted into a reagent reservoir of a microfluidic well array device as described in International Application No. PCT/US2016/042913 and International Application No. PCT/US2016/043463. The solution flowed through the channel and filled the microarray chamber by capillary action. After the array was completely filled, partial vacuum was applied to evacuate the solution from the chip and evaporate the residual solvent, leaving behind a thin film of 3-dodecylheptamethyltrisiloxane on the array surface and in the microwells.

Figure 2:
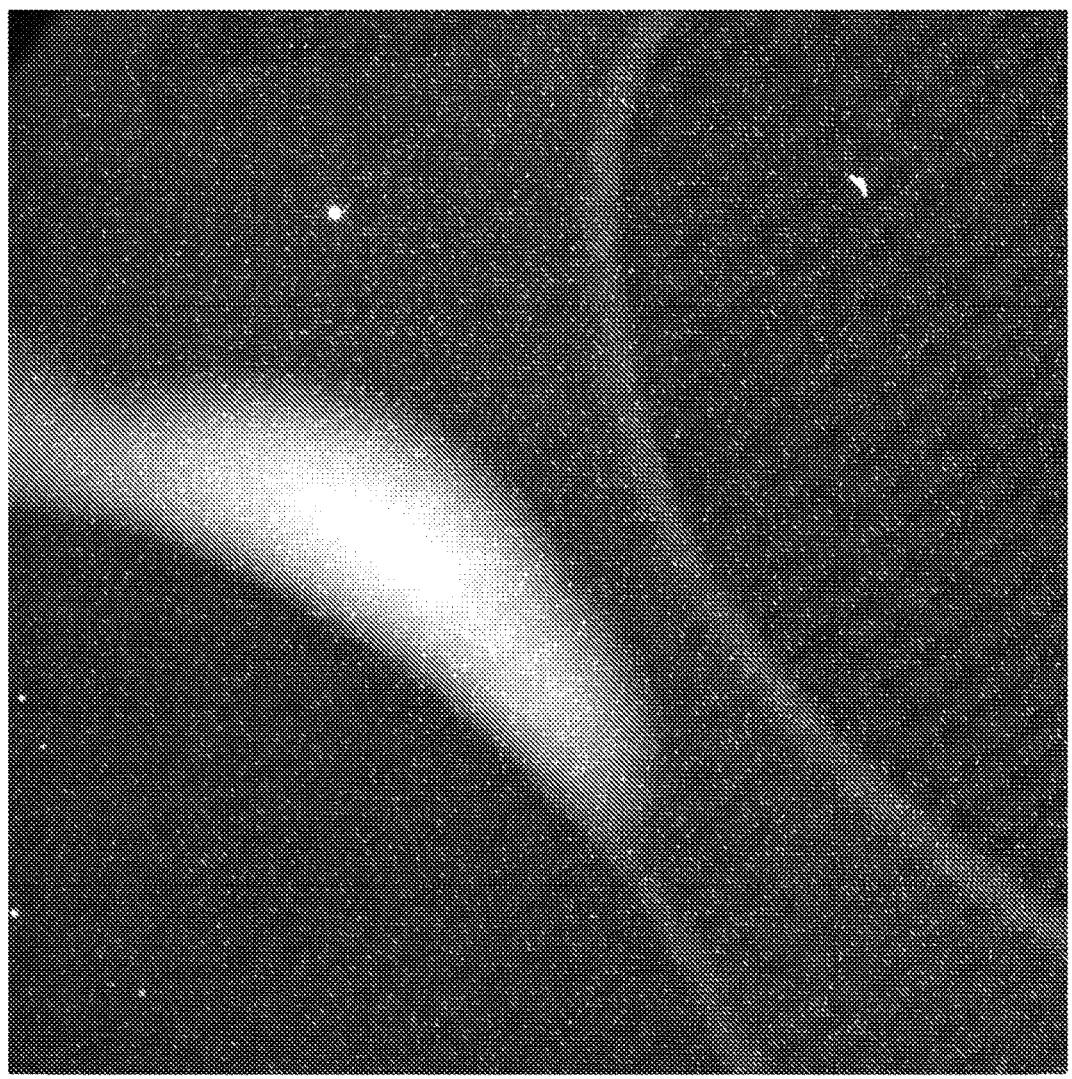
FIG. 2 shows an image after sealing a device prepared for aqueous ELISA assays containing nonionic surfactants with native surface COP plastic using DuPont™ KRYTOX® GPL 104, a perfluoropolyether (PFPE) oil. Note the large areas of aqueous bridging between wells (such as the white, kidney shaped area) and on the top surface of the array chamber (hourglass shaped area running diagonally from upper left to lower right-hand corner).
Figure 7:
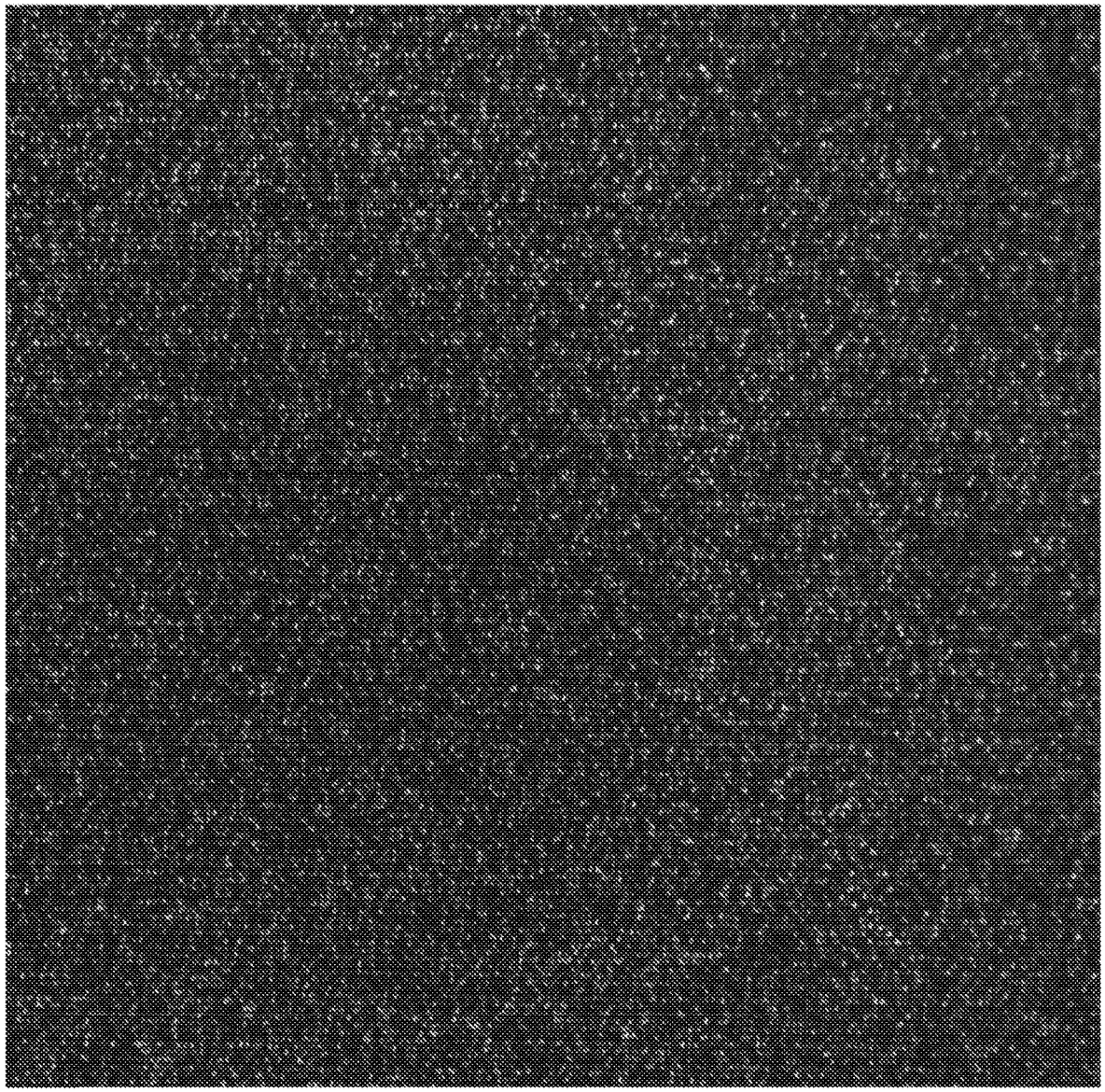
FIG. 7 shows an image of an array after pretreatment with 3-dodecylheptamethyltrisiloxane (1% by volume) in hexamethyldisiloxane using the FED coating method and after sealing with KRYTOX® oil.
Figure 8A:
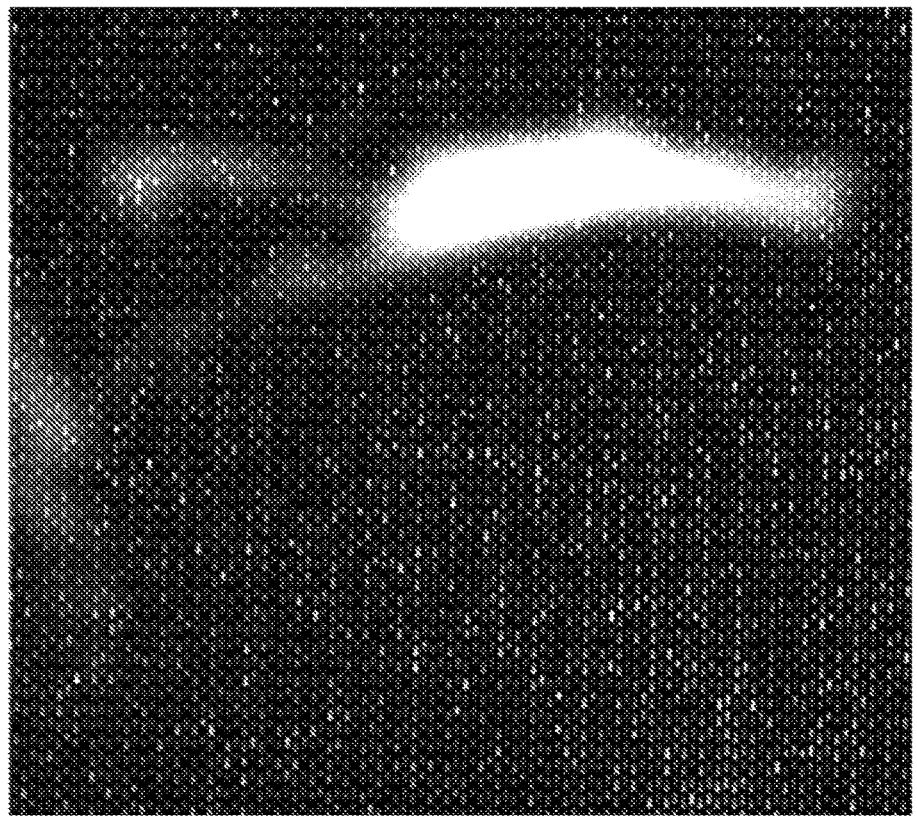
FIG. 8A shows an image of an array in which single molecule enzyme reactions are shown sealed with KRYTOX® oil on a native COP surface.
Figure 8B:
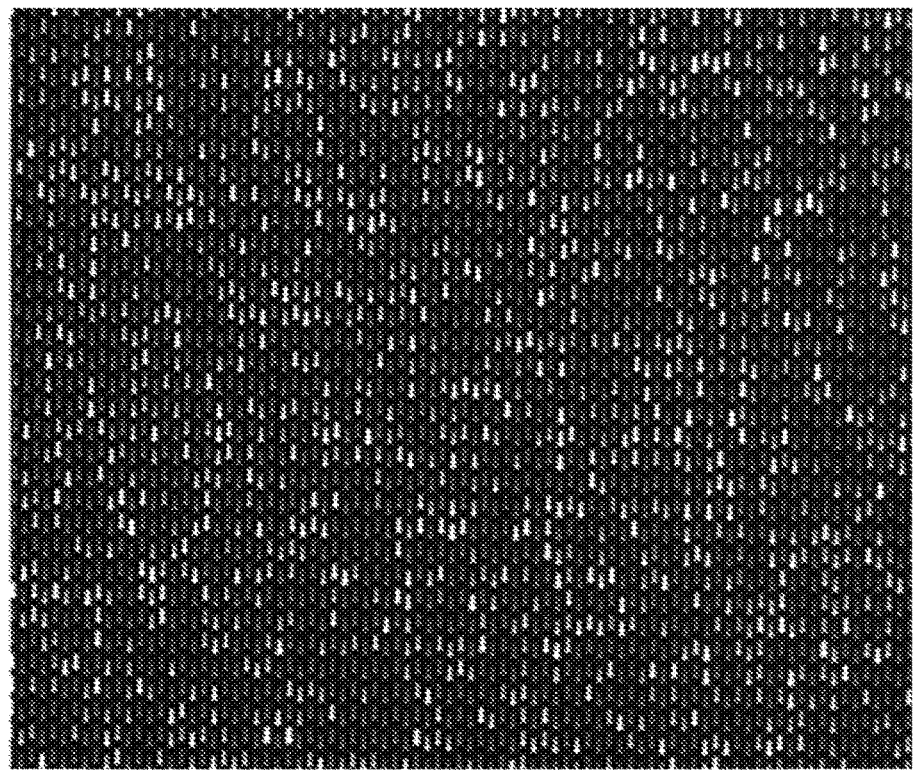
FIG. 8B shows an image of an array in which single molecule enzyme reactions are shown sealed with KRYTOX® oil on a surface treated with 3-dodecylheptamethyltrisiloxane in hexamethyldisiloxane solvent.

The arrays were filled with a fluorogenic substrate solution containing phosphate buffered saline, resorufin β-D-galactopyranoside (RGP), 0.1% Tween 20, and a low concentration of streptavidin-β-galactosidase enzyme. To accomplishing the filling, about 45 µL of the solution was added to a reagent reservoir and pulled through the chip using partial vacuum applied at another reservoir. After the array was filled, about 45 µL of DuPont™ KRYTOX® GPL 104 oil was added to a reservoir and pulled across the array using partial vacuum until the array chamber was emptied of aqueous solution and filled with the oil. In the reaction wells where one or more enzyme molecules were trapped with the substrate solution, the RGP was converted to fluorescent resorufin dye that could be visualized using fluorescence microscopy as shown in FIGS. 7 and 8B. The native COP surface (i.e., without the film) is shown in FIG. 2 and FIG. 8A.

As can be seen in FIGS. 7 and 8B, using this coating and coating procedure, the vast majority of reaction wells were fluidically isolated from one another and a stochastic distribution of enzyme molecules could be seen at concentrations of enzyme low enough such that the majority of wells on average contained either zero, one, two, or three enzyme molecules. That is, the occupancy of the wells by enzyme molecules could be modelled using Poisson statistics.

Example 2

A solution of about 1% 3-dodecylheptamethyltrisiloxane (commercially available from Gelest, CAS No: 139614-44-1) dissolved in hexamethyldisiloxane was prepared. About 45 µL of the solution was pipetted into a reagent reservoir of a microfluidic well array device as described in International Application No. PCT/US2016/042913 and International Application No. PCT/US2016/043463. The solution flowed through the channel and filled the microarray chamber by capillary action. After the array was completely filled, partial vacuum was applied to evacuate the solution from the chip and evaporate the residual solvent, leaving behind a thin film of 3-dodecylheptamethyltrisiloxane on the array surface and in the microwells.

Figure 9A:
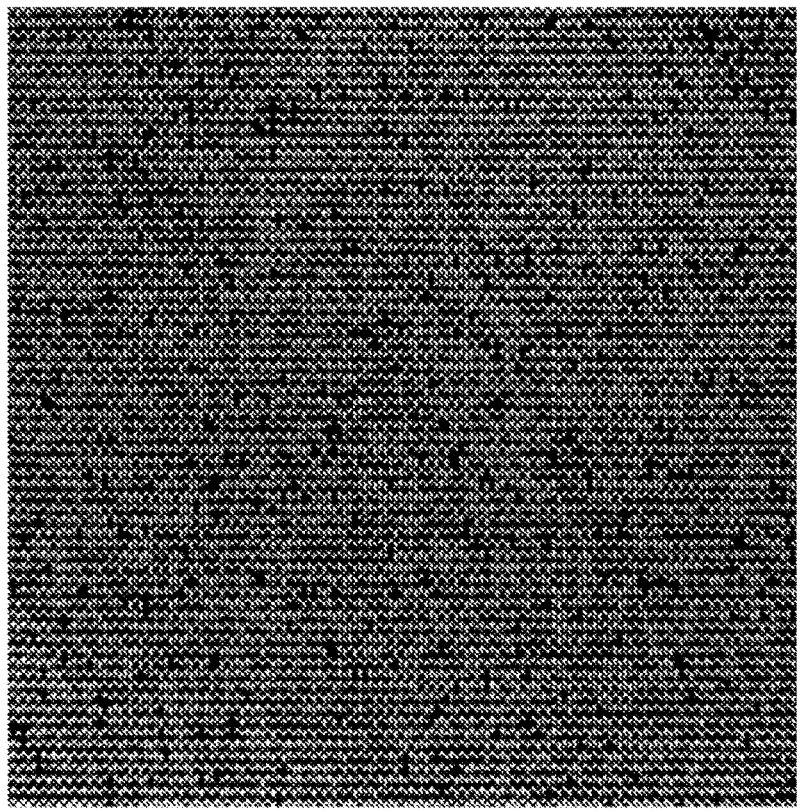
FIG. 9A shows an image of part of a plastic microwell array loaded with beads after PCR cycling.
Figure 9B:
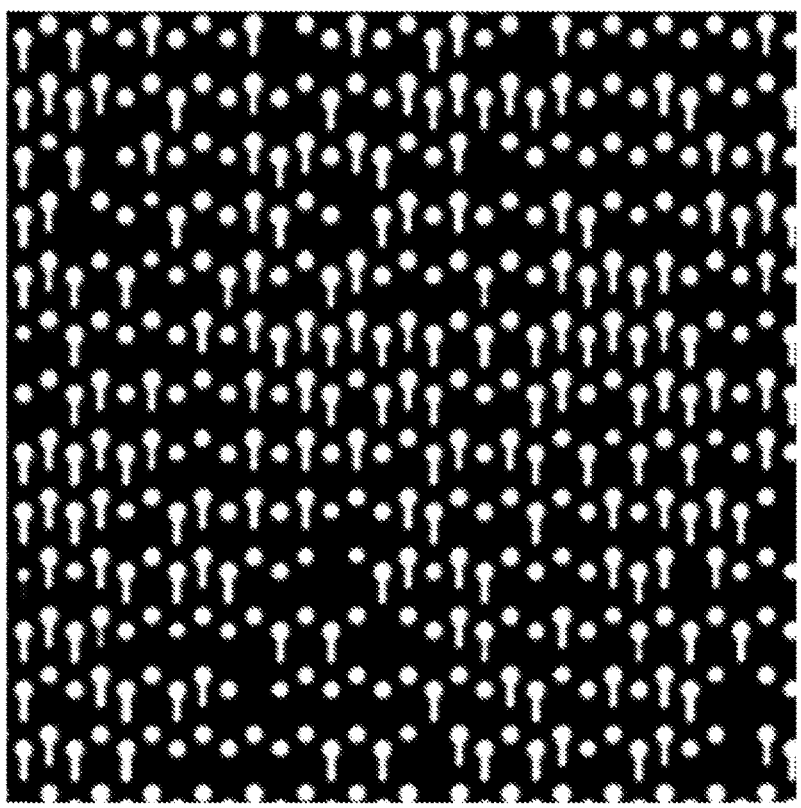
FIG. 9B shows an image of a closer view of the same array of FIG. 9A showing empty wells, wells with negative beads, and wells with positive beads.

The microfluidic device was filled with a Tris-based buffer containing a low concentration of Tween 20. Magnetic microbeads containing forward and reverse primers were added to the device and magnetically transported to the array. A wide bar magnet (≈2× to 3× wider than the array width) was used to distribute and load the beads into the microwells. A master mix solution containing all the components needed for PCR except the primers was added to the device, displacing the loading buffer. In practice, the sample can be incubated with the beads in a hybridization buffer to capture and purify target DNA before transport of the beads to the array. Alternatively, the sample can be added as a component of the master mix, especially if it has already been purified from a sample matrix. DuPont™ KRYTOX® GPL 104 sealing oil was added to the chip. A pressure differential was used to draw the oil over the array, displacing aqueous master mix from the area above the array wells and the substrate surface. After sealing, the array was thermocycled to perform real-time PCR reactions in the wells. Fluorescence microscopy images taken after each cycle of PCR were used to generate both digital and analog amplification data and determine the target nucleic acid concentration as determined by the emission intensity of an intercalating dye. FIG. 9A shows part of a microwell array loaded with SiRCA beads after amplification. FIG. 9B is a zoomed in view of the array of FIG. 7A and shows wells that contain no bead (dark), negative beads (bright circular region only), and positive beads (bright circular and slit regions). A melting point curve can also be taken after amplification to determine or verify the amplicon identity. The number of PCR positive wells and/or the cycle threshold can be determined. Poisson statistics and, real-time PCR techniques can be used, alone or in combination, to determine the average number of PCR template per bead, and thus the concentration of PCR template in a sample. This technique can be used not only for nucleic acid assays, but also for protein assays performed using immuno-PCR or ELISA reactions, optionally bead-based or solid-phase.

The foregoing is illustrative of the present invention, and is not to be construed as limiting thereof. The invention is defined by the following claims, with equivalents of the claims to be included therein. All publications, patent applications, patents, patent publications, and other references cited herein are incorporated by reference in their entireties for the teachings relevant to the sentence and/or paragraph in which the reference is presented.

That which is claimed is:

1. A method of forming a film on a surface of a substrate, wherein the substrate is a microwell device, the method comprising:
    contacting the surface of the substrate with a composition, wherein the composition comprises a coating reagent and a solvent,
    wherein the coating reagent is a siloxane having a structure of Formula III:

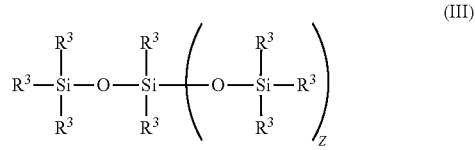

(III)

wherein each $R^3$ is a substituted or unsubstituted alkyl, and at least one $R^3$ is a substituted or unsubstituted C3-C30 alkyl; and z is an integer from 1 to 10; and
    wherein the solvent is a polysiloxane having a viscosity of less than about 0.7 centistokes at 25° C.;
    wherein the coating reagent is present in the composition in an amount from about 0.01% to about 5% by volume of the solvent; and
    forming the film of the coating reagent on the surface of the substrate.

2. The method of claim 1, wherein the coating reagent is 3-dodecylheptamethyltrisiloxane and the solvent is hexamethyldisiloxane.

3. The method of claim 1, wherein the microwell device comprises an array comprising a plurality of wells each having volume from about 10 attoliters to about 100 microliters, and/or wherein contacting the surface of the substrate with the composition comprises filling the array with the composition.

4. The method of claim 3, wherein the composition fills and/or wets at least 50% of the volume of the array.

5. The method of claim 1, wherein forming the film of the coating reagent on the surface of the substrate comprises drying the composition on the surface of the substrate.

6. The method of claim 5, further comprising, prior to drying the composition on the surface of the substrate, removing at least a portion of the composition from the substrate.

7. The method of claim 1, wherein the film has a thickness of from about 1 nm to about 300 microns.

8. The method of claim 1, wherein the substrate comprises a plurality of wells and the surface of the substrate comprises a first portion that is a surface of a well in the plurality of wells and a second portion that is a surface between two or more wells in the plurality of wells, and wherein the film has a greater thickness on the first portion compared to a thickness of the film on the second portion and/or wherein the film has a greater concentration of the coating reagent on the first portion compared to a concentration of the coating reagent on the second portion.

9. The method of claim 1, wherein the substrate comprises a plurality of wells and less than about 10% of the wells are bridged and/or fluidically connected after an aqueous composition is added onto the film on the surface of the substrate and the plurality of wells comprising the aqueous composition are sealed with an oil.

10. The method of claim 1, wherein the composition covers at least 95% of the surface of the substrate.

11. The method of claim 1, wherein contacting the surface of the substrate with the composition comprises spraying the composition on the surface of the substrate.

12. The method of claim 1, wherein forming the film of the coating reagent on the surface of the substrate comprises evaporating the solvent.

13. The method of claim 1, wherein the film increases the hydrophobicity of the surface of the substrate.

14. The method of claim 1, further comprising adding an oil onto the film on the surface of the substrate.

15. The method of claim 1, wherein the substrate comprises a plastic, cyclic olefin copolymer (COC), cyclic olefin polymer (COP), polycarbonate, acrylic, fluoropolymer, silicone, glass, silicon, and/or metal surface.

16. The method of claim 1, wherein the film prevents an aqueous composition from adhering and/or adsorbing to the surface or reduces the amount of the aqueous composition that adheres and/or adsorbs to the surface.

17. The method of claim 1, wherein the film improves aqueous dewetting of the substrate during sealing of the substrate with an oil compared to the aqueous dewetting of the substrate during sealing in the absence of the film.

18. The method of claim 1, wherein the coating reagent comprises at least one hydrophobic moiety, wherein the at least one hydrophobic moiety binds and/or interacts with the surface of the substrate.

19. The method of claim 1, wherein the film on the surface of the substrate reduces the adherence of a biomolecule to the surface of the substrate compared to the adherence of the biomolecule to the surface of the substrate in the absence of the film.

20. The method of claim 1, wherein the surface of the substrate is in contact with an aqueous composition prior to contacting the surface of the substrate with the composition comprising the coating reagent.

21. The method of claim 1, further comprising contacting an aqueous composition to the surface of the substrate prior to contacting the surface of the substrate with the composition comprising the coating reagent.

\* \* \* \* \*

UNITED STATES PATENT AND TRADEMARK OFFICE
CERTIFICATE OF CORRECTION

Page 1 of 1

PATENT NO. : 12,234,377 B2
APPLICATION NO. : 17/048114
DATED : February 25, 2025
INVENTOR(S) : Ramsey et al.

It is certified that error appears in the above-identified patent and that said Letters Patent is hereby corrected as shown below:

In the Specification

Column 8, Lines 44-45: Please correct "do decamethylcyclohexasiloxane." to read --dodecamethylcyclohexasiloxane.--

Signed and Sealed this
Fifteenth Day of July, 2025

Coke Morgan Stewart
*Acting Director of the United States Patent and Trademark Office*